(12) United States Patent
Kulyk et al.

(10) Patent No.: US 8,527,109 B2
(45) Date of Patent: Sep. 3, 2013

(54) METHOD AND APPARATUS FOR MANAGING AN ENERGY CONSUMING LOAD

(75) Inventors: Roman Kulyk, Toronto (CA); Mark Kerbel, Toronto (CA)

(73) Assignee: REGEN Energy Inc., Toronto (CA)

( * ) Notice: Subject to any disclaimer, the term of this patent is extended or adjusted under 35 U.S.C. 154(b) by 271 days.

(21) Appl. No.: 13/012,480

(22) Filed: Jan. 24, 2011

(65) Prior Publication Data

US 2011/0172845 A1     Jul. 14, 2011

Related U.S. Application Data

(60) Continuation-in-part of application No. 12/509,638, filed on Jul. 27, 2009, now Pat. No. 7,894,946, which is a division of application No. 11/484,411, filed on Jul. 11, 2006, now Pat. No. 7,580,775.

(51) Int. Cl.
*G06F 1/26* (2006.01)
(52) U.S. Cl.
USPC .......................................... 700/296; 700/295
(58) Field of Classification Search
USPC ................................................. 700/295, 296
See application file for complete search history.

(56) References Cited

U.S. PATENT DOCUMENTS

| | | | |
|---|---|---|---|
| 4,023,043 A | 5/1977 | Stevenson | |
| 4,153,936 A | 5/1979 | Schmitz et al. | |
| 4,245,319 A | 1/1981 | Hedges | |
| 4,247,786 A | 1/1981 | Hedges | |
| 4,264,960 A | 4/1981 | Gurr | |
| 4,321,477 A | 3/1982 | Bartlett | |
| 4,347,576 A | 8/1982 | Kensinger et al. | |
| 4,357,665 A | 11/1982 | Korff | |
| 4,510,398 A | 4/1985 | Culp et al. | |
| 4,520,274 A | 5/1985 | Stants | |
| 4,612,619 A | 9/1986 | Culp | |

(Continued)

FOREIGN PATENT DOCUMENTS

| | | |
|---|---|---|
| EP | 0456872 A1 | 11/1991 |
| EP | 0814393 B1 | 8/2002 |
| WO | 2008145985 | 12/2008 |

OTHER PUBLICATIONS

Brazier, Frances M.T. et al., "A multi-agent system performing one-to-many negotiation for load balancing of electricity use," Electronic Commerce Research and Applications, 1 (2002), 208-224.

(Continued)

*Primary Examiner* — Ryan Jarrett
(74) *Attorney, Agent, or Firm* — Terrence N. Kuharchuk; Rodman & Rodman

(57) ABSTRACT

A method for managing an energy consuming load in a group of energy consuming loads and a method for managing the group of energy consuming loads. The method includes generating sets of load state data from the loads, making enablement state decisions for one or more loads using the sets of load state data, and implementing the enablement state decisions. An apparatus for managing an energy consuming load in a group of energy consuming loads, including a transmitter, a receiver, a processor for processing sets of load state data to make an enablement state decision for the load, and a controller for implementing the enablement state decision. A method for managing an enablement state of an energy consuming load, including assigning an assigned duty cycle to the load, determining a load enabled utilization value for the load, and adjusting the assigned duty cycle using the load enabled utilization value.

53 Claims, 11 Drawing Sheets

(56) References Cited

U.S. PATENT DOCUMENTS

| | | | |
|---|---|---|---|
| 4,686,630 | A | 8/1987 | Marsland et al. |
| 5,244,146 | A | 9/1993 | Jefferson et al. |
| 5,502,339 | A | 3/1996 | Hartig |
| 5,517,423 | A | 5/1996 | Pomatto |
| 5,625,236 | A | 4/1997 | Lefebvre et al. |
| 5,675,503 | A | 10/1997 | Moe et al. |
| 6,044,062 | A | 3/2000 | Brownrigg et al. |
| 6,249,516 | B1 | 6/2001 | Brownrigg et al. |
| 6,842,674 | B2 | 1/2005 | Soloman |
| 7,032,398 | B2 | 4/2006 | Dilk et al. |
| 7,301,455 | B2 | 11/2007 | McKenna et al. |
| 7,373,222 | B1 | 5/2008 | Wright et al. |
| 7,606,639 | B2 | 10/2009 | Miyaji |
| 7,750,498 | B2 | 7/2010 | Wight et al. |
| 2002/0162032 | A1 | 10/2002 | Gundersen et al. |
| 2005/0055432 | A1 | 3/2005 | Rodgers |
| 2005/0192713 | A1 | 9/2005 | Weik et al. |
| 2008/0030319 | A1 | 2/2008 | McKenna et al. |
| 2009/0216387 | A1 | 8/2009 | Klein |
| 2010/0070103 | A1 | 3/2010 | Fleck et al. |

OTHER PUBLICATIONS

Van Dyke Parunak, H., "An emergent approach to systems of physical agents," J. Expt. Theor. Artif. Intell. 9 (1997) 211-213.

Rosario, L.C., "Multi-Agent Load Power Segregation for Electric Vehicles," 2005 IEEE Vehicle Power and Propulsion Conference (IEEE Cat. o. 05EX1117C), 2006, 91-96.

Abstract for Valckenaers, P., "On the design of emergent systems: an investigation of integration and interoperability issues," Engineering Applications of Art. Intell., v. 16. N. 4, Jun. 2003, 377-93 (1 page).

Abstract for Ward, J., "Sensor networks for agent based distributed energy resources." The Second IEEE Workshop on Embedded Networked Sensors (IEEE Cat. No. 05EX1105), 2005, p. 159-160 (1 page).

Abstract for Fischer, K., "Specialized agent applications," Multi-Agent Systems and Appls., 9th ECCAI Advanced Course, ACAI 2001 and Agent Links 3rd European agent Systems Summer School, EASSS 2001, Selected Tutorial Papers (Lecture Notes in Computer Science vol. 2086), 2001, p. 365-82 (1 page).

Abstract for Szladow, Adam J. et al., "Improving energy efficiency with intelligent systems," Annual Meeting—Technical Section, Canadian Pulp and Paper Association, Preprints, v C, 2001, p. C53-C56 (1 page).

Vigorito, Christopher M. et al., "Adaptive Control of Duty Cycling in Energy-Harvesting Wireless Sensor Networks," IEEE SECON, 2007, p. 21-30.

Lee, Dongho et al., "Adaptive Duty Cycle Based Congestion Control for Home Automation Networks," IEEE Transactions on Consumer Electronics, Feb. 2010, p. 41-47, vol. 56, No. 1, IEEE.

Hsu, Jason et al., "Adaptive Duty Cycling for Energy Harvesting Systems," ISLPED'06, Oct. 4-6, 2006, Tegensee, Germany, p. 180-185.

Abstract for Kim, Hyeong Jung et al., "Development of variable duty cycle control method for air conditioner using artificial neural network," Transactions of the Korean Institute of Electrical Engineers, A, 2006, p. 399-409, vol. 55—Issue 10, Korean Institute of Electrical Engineers, South Korea (2 pages).

Zhou, Youling et al., "A Duty Cycle Adaptive Algorithm Based on Throughput," International Conference on Information Technology and Computer Science, 2009, p. 39-42, IEEE.

Hong, Ying-Yi et al., "MPPT for PM wind generator using gradient approximation," 2008, p. 82-89, Elsevier Ltd.

Wang, Pengpeng et al., "A New Adaptive Duty Cycle Perturbation Algorithm for Peak Power Tracking," 2nd International Asia Conference on Informatics in Control, Automation and Robotics, 2010, p. 298-301, IEEE.

Ng, Kah-Hoe et al., "Direct Load Control—A Cost-Based Load Management using Linear Programming," Department of Electrical and Computer Engineering, Iowa State University, AMES, IA 50011 (11 pages), undated (printed from http://class.ee.iastate.edu on Nov. 4, 2010).

FIG. 9

| $n_0$ | 0 | 1 | 2 | 3 | 4 | 5 | 6 | 7 | 8 | 9 | 10 | 11 |
|---|---|---|---|---|---|---|---|---|---|---|---|---|
| Load 1 | | | | | | | | | | | | |
| Processing Order | | 1 | 1 | 2 | 1 | 2 | 1 | 2 | 1 | 2 | 1 | 3 |
| $I_{CSE}$ | | 275 | 275 | 275 | 275 | 275 | 275 | 275 | 275 | 275 | 275 | 275 |
| $I_{MAX}$ | | 500 | 500 | 500 | 500 | 500 | 500 | 500 | 500 | 500 | 500 | 500 |
| $I_{CUMSL}$ | | 500 | 500 | 1500 | 500 | 1500 | 500 | 1500 | 500 | 1500 | 500 | 500 |
| $n_{SN}$ | 7 | 6 | 5 | 4 | 4 | 3 | 3 | 2 | 2 | 1 | 1 | 0 |
| $I_{GT}$ | 1125 | 1125 | 1125 | -375 | 1125 | -375 | 1125 | -375 | 1125 | -375 | 1125 | 1125 |
| Decision | enable | enable | disable | enable | enable | disable | enable | disable | enable | disable | enable | disable |
| Load 2 | | | | | | | | | | | | |
| Processing Order | | 2 | 3 | 2 | 3 | 2 | 3 | 2 | 3 | 2 | 3 | 2 |
| $I_{CSE}$ | | 400 | 400 | 400 | 400 | 400 | 400 | 400 | 400 | 400 | 400 | 400 |
| $I_{MAX}$ | | 1000 | 1000 | 1000 | 1000 | 1000 | 1000 | 1000 | 1000 | 1000 | 1000 | 1000 |
| $I_{CUMSL}$ | | 1500 | 1500 | 1500 | 1000 | 1500 | 1000 | 1500 | 1000 | 1500 | 1000 | 1000 |
| $n_{SN}$ | 5 | 4 | 3 | 2 | 2 | 1 | 1 | 0 | 0 | 0 | 0 | 0 |
| $I_{GT}$ | 625 | 625 | 625 | -375 | 625 | -375 | 625 | -375 | 625 | -375 | 625 | 1125 |
| Decision | enable | enable | disable | enable | disable | enable | disable | enable | disable | enable | disable | disable |
| Load 3 | | | | | | | | | | | | |
| Processing Order | | 2 | 2 | 1 | 2 | 1 | 2 | 1 | 2 | 1 | 2 | 1 |
| $I_{CSE}$ | | 450 | 450 | 450 | 450 | 450 | 450 | 450 | 450 | 450 | 450 | 450 |
| $I_{MAX}$ | | 1500 | 1500 | 1500 | 1500 | 1500 | 1500 | 1500 | 1500 | 1500 | 1500 | 1500 |
| $I_{CUMSL}$ | | 500 | 500 | 1500 | 500 | 1500 | 500 | 1500 | 500 | 1500 | 500 | 1500 |
| $n_{SN}$ | 4 | 4 | 4 | 3 | 3 | 2 | 2 | 1 | 1 | 0 | 0 | 0 |
| $I_{GT}$ | -375 | 625 | 625 | 1125 | 625 | 1125 | 625 | 1125 | 625 | 1125 | 625 | 1125 |
| Decision | disable | enable | enable | disable | enable | disable | enable | disable | enable | disable | disable | disable |
| $I_{SFD}$ | -375 | -750 | -1125 | -1500 | -1875 | -2250 | -2625 | -3000 | -2375 | -2750 | -2125 | -1000 |
| $I_{TSE}$ | 1125 | 1125 | 1125 | 1125 | 1125 | 1125 | 1125 | 1125 | 1125 | 1125 | 1125 | 1125 |
| $I_{CUMSL}$ | 1500 | 1500 | 1500 | 1500 | 1500 | 1500 | 1500 | 1500 | 500 | 1500 | 500 | 0 |

METHOD AND APPARATUS FOR MANAGING AN ENERGY CONSUMING LOAD

This application is a continuation-in-part of U.S. patent application Ser. No. 12/509,638, filed Jul. 27, 2009, now allowed, which is a division of U.S. patent application Ser. No. 11/484,411, filed Jul. 11, 2006, which issued as U.S. Pat. No. 7,580,775 on Aug. 25, 2009.

TECHNICAL FIELD

A method and apparatus for managing a group of energy consuming loads and for managing an energy consuming load in a group of energy consuming loads.

BACKGROUND OF THE INVENTION

Energy is provided by suppliers to consumers in many forms and from many sources. Typical forms and sources of energy include electricity, natural gas, coal, oil, atomic energy etc.

Escalating energy costs and infrastructure costs have made managing both energy supply and energy consumption a critical issue which is important to both suppliers of energy and consumers of energy.

From a supplier's perspective, both the energy consumption of consumers and the energy demand by consumers must be accommodated by the energy infrastructure. Energy consumption is the total amount of energy which is consumed over a time period, while energy demand is the rate at which the energy is consumed. Peak energy demand is the maximum rate at which energy is consumed. Energy consumption over a time period is a function of the energy demand over the time period.

An energy infrastructure must be capable of supplying the total amount of energy that is required by consumers and must also be capable of satisfying the peak demand for energy which is imposed upon the energy infrastructure.

In a typical energy supply system, the energy demand fluctuates over minutes, hours, days, weeks, months etc. Since energy consumption is a function of energy demand, an energy supply system in which energy consumption is relatively low may exhibit a relatively high peak energy demand if the energy demand fluctuates greatly, while an energy supply system in which energy consumption is relatively high may exhibit a relatively low peak energy demand if the energy demand fluctuates minimally.

An efficient energy supply system is a system in which the energy demand fluctuates minimally, since the energy infrastructure must be designed to satisfy the peak demand. As the fluctuation of the energy demand decreases, the peak energy demand for the energy supply system approaches the average energy demand on the energy supply system, which is the lowest peak energy demand which can be attained for the energy supply system. The energy demand on an energy supply system is therefore preferably managed so that the peak energy demand is minimized.

An energy supply system may provide energy to any number of consumers. The energy demand on an energy supply system may be managed on one level by managing the energy demands of the consumers who are connected with the energy supply system. The energy demand on an energy supply system may also be managed on a second level by managing the energy demands of the individual energy consuming loads which are connected with the energy supply system through the consumers.

In either case, managing the energy demand on the energy supply system involves distributing the energy demands of consumers and/or loads in order to avoid a large peak energy demand on the energy supply system. The distribution of energy demands may be accomplished by adjusting the times at which "discretionary loads" consume energy from the energy supply system.

A discretionary load is an energy consuming load which is not required to be operated rigidly according to a fixed schedule, or rigidly according to a fixed set of constraints such as temperature, humidity, etc., with the result that the time or times at which it consumes energy can be adjusted. Typically, a discretionary load has a duty cycle which is less than 100 percent, where duty cycle is defined as the percentage of time that the load must operate in order to satisfy its assigned objectives.

For example, if a heater must operate 50 percent of the time in order to maintain a desired temperature within a space, the duty cycle for the heater is 50 percent. If the heater isn't required to operate rigidly according to a fixed schedule, or rigidly within a fixed set of constraints while satisfying its duty cycle, the heater is also a discretionary load.

Some energy suppliers provide incentives or disincentives to consumers to assist in managing the energy demand on the energy supply system.

For example, in the case of an electrical system, suppliers may include in their billing both a "consumption charge" and a "peak demand charge", particularly in the case of commercial, institutional and industrial consumers. The consumption charge is based upon the total amount of electricity consumed in the billing period (typically measured in kilowatt-hours, or "kWh"). The peak demand charge is often based upon the greatest amount of electricity used during a sustained fifteen minute period (typically measured in kilowatts, or "kW").

The consumption charge compensates the supplier for the electricity which is consumed by a consumer. The peak demand charge compensates the supplier for the energy infrastructure which must be provided in order to accommodate the peak demand on the electrical system.

It may therefore be in the financial interest of a consumer to manage its energy demand in order to minimize the peak energy demand which is imposed by the consumer on the energy supply system.

Systems have been contemplated for managing energy consumption and/or energy demand.

U.S. Pat. No. 4,023,043 (Stevenson) describes a system and method for lowering electrical energy peak demand while minimizing service disruption, which includes a centralized transmitter means which generates and transmits signals which disconnect interruptible loads in response to the approach of an excessive demand peak, and which generates and transmits signals to reconnect the interruptible loads thereafter, based upon characteristic projected energy consumption profiles predicted from past historical records.

U.S. Pat. No. 4,264,960 (Gurr) describes a system for permitting an electric power utility to control the distribution of its power along its power lines from a substation to a plurality of customer loads. The system provides direct control of customer loads with a view toward facilitating enablement of a load management philosophy which includes peak shaving and load deferral. The system includes a master control station which generates master control signals which are converted to pulse code signals by a substation injection unit, wherein the pulse code signals provide instructions for connecting or disconnecting customer loads from the power lines.

U.S. Pat. No. 4,686,630 (Marsland et al) describes a load management control system and method which communicates load shedding information from a central station controller to a substation controller. The substation controller then sends encoded step voltage signals down a power distribution line to a load control receiver, which decodes the signals and controls loads which are associated with the load control receiver.

U.S. Pat. No. 5,244,146 (Jefferson et al) describes an apparatus and method for controlling the operation of an HVAC system in order to conserve energy. The method involves initiating a "fuel-on interval" in which fuel is consumed by the HVAC system, terminating the fuel-on interval and initiating a "fuel-off interval" in which fuel is not consumed by the HVAC system. Heat is distributed through the HVAC system during a "delivery interval" which is initiated during the fuel-off interval. The apparatus includes a thermostat which initiates and terminates the fuel-on interval, the fuel-off interval, and the delivery interval.

European Patent Specification No. EP 0 814 393 B1 (Eriksson et al) describes a system for controlling and supervising electrical components/devices connected to an electrical network via a public information network, wherein the system is accessible from any terminal connected to the public information network.

U.S. Patent Application Publication No. US 2002/0162032 A1 (Gundersen et al) describes a system, method and computer program for providing automated load management in an electrical power generation, transmission and distribution network by means of control signals in a communications protocol which is compatible with the world wide web and other Internet technologies. The method involves the carrying out by a load point device of load shaving or load shedding actions affecting loads, which actions are based upon decisions calculated using reference information for the loads which are stored in the device.

U.S. Patent Application Publication No. US 2005/0192713 A1 (Weik et al) describes a method of managing energy consumption by a group of energy consuming devices. The energy consuming devices exchange messages according to an energy management control protocol via a communication media. The energy management control protocol includes an energy booking message type for announcing future energy consumption, an energy reduction indication type for announcing possible reduction of energy consumption, and a granting message type for granting an energy booking message and/or an energy reduction indication. The energy consuming devices negotiate their energy consumption by means of the messages exchanged according to the energy management control protocol and control their energy consumption according to the result of this negotiation. The group of energy consuming devices are described as constituting a self-organizing network which negotiate with each other according to scheduling rules without a central energy management control device to provide scheduling functionalities.

Self-organization as referred to in Weik et al is somewhat related to multi-agent systems and emergence theory. Self organization is a process in which the internal organization of a system increases in complexity without guidance or management from an outside source. A multi-agent system is a system composed of a group of agents which interact according to defined rules to achieve functionality that would be difficult or impossible to achieve by the agents acting individually. Emergence is the process of complex pattern formation from simple rules.

Emergence is sometimes described with reference to "swarm" or "hive" behaviour whereby a group of simple devices, acting in a swarm, can exhibit behaviour which is seemingly more intelligent and complex than the simple behaviour programmed into the individual devices.

Both multi-agent systems and emergence theory have been proposed for use in controlling complex environments.

Brazier, Frances M. T., Cornelissen, Frank, Gustaysson, Rune, Jonker, Catholijn M., Lindeberg, Olle, Polak, Bianca and Treur, Jan, "A Multi-Agent System Performing One-To-Many Negotiation for Load Balancing of Electricity Use", Electronic Commerce Research And Applications, 1 (2002) 208-224 describes a prototype system which involves interaction between a Utility Agent (i.e., a utility supplier) and a group of Customer Agents (i.e., consumers) for the purpose of negotiating for the supply of electricity from the Utility Agent to the Customer Agents.

Van Dyke Parunak, H., "An Emergent Approach to Systems of Physical Agents", J. Expt. Theor. Artif. Intell. 9 (1997) 211-213 describes an application of emergence theory in which "agents" (such as parts and equipment) interact with each other in order to permit an overall shop schedule to emerge dynamically from the interaction, instead of being imposed top-down from a central control.

Rosario, L. C., "Multi-Agent Load Power Segregation for Electric Vehicles", 2005 IEEE Vehicle Power and Propulsion Conference (IEEE Cat. No. 05EX1117C), 2006, p 6 pp. describes the prioritization of activation of agents, wherein the agents are comprised of non-propulsion loads which have been segregated into multi-priority, multi-time constant electrical burdens which may be imposed on an onboard energy storage system in an electric vehicle. The prioritization is performed using an algorithm which ensures the availability of the propulsion load demand by arbitrating the activation of the non-propulsion agents based upon assigned priority levels. This paper is described as providing an initial step toward ongoing investigations into agent based power and energy management schemes.

Valckenaers, P. "On the Design of Emergent Systems: An Investigation of Integration and Interoperability Issues", Engineering Applications of Artificial Intelligence, v. 16, n. 4, Jun. 2003, p. 377-93 discusses design principles for the design of components for emergent systems, based upon experience gained during the development of research prototypes for multiagent manufacturing control systems.

Ward, J., "Sensor Networks for Agent Based Distributed Energy Resources", The Second IEEE Workshop on Embedded Networked Sensors (IEEE Cat. No. 05EX1105), 2005, p. 159-60 describes the development of agents for the control of distributed energy resources (DERs) in an electricity network, which resources include both generators and loads. The agents may be used to allow collaboration amongst DERs in order to generate an aggregated response by the DERs to support the electricity network at times of peak demand.

Fischer, K., "Specialised Agent Applications", Multi-Agent Systems and Applications, $9^{th}$ ECCAI Advanced Course, ACAI 2001 and Agent Link's $3^{rd}$ European Agent Systems Summer Scholl, EASSS 2001, Selected Tutorial Papers (Lecture Notes in Computer Science Vol. 2086), 2001; p. 365-82 provides an overview of multi-agent system applications, focusing on the application of multi-agent systems in the context of supply chain management in virtual enterprises.

There remains a need for a method and/or system for managing a group of energy consuming loads and/or an energy consuming load in the group of energy consuming loads which is relatively simple, which does not require negotiation amongst the loads, and which may be used either with or without centralized control of the loads.

There remains a need for such a method and/or system for use in managing the energy demands of the loads and the collective energy demand of the group of loads with the goal of controlling the peak energy demand which is exhibited by the group of loads.

There remains a need for such a method and/or system in which each of the loads is controlled using relatively simple rules which are applicable to each of the loads.

SUMMARY OF THE INVENTION

The present invention includes a method for managing a group of energy consuming loads comprising a plurality of loads, a method for managing an energy consuming load in a group of energy consuming loads, an apparatus for managing an energy consuming load in a group of energy consuming loads, a computer readable medium providing computer readable instructions for managing an energy consuming load in a group of energy consuming loads, an apparatus for receiving and processing the computer readable instructions in order to manage an energy consuming load in a group of energy consuming loads, a system of managed energy consuming loads, and a system for managing an energy consuming load in a group of energy consuming loads.

The present invention also includes a method for managing an enablement state of an energy consuming load, a computer readable medium providing computer readable instructions for directing a processor to manage an enablement state of an energy consuming load, and an apparatus for managing an enablement state of an energy consuming load.

The invention is preferably directed at managing the energy demands of energy consuming loads and the collective energy demand of a group of energy consuming loads with the goal of controlling the peak energy demand of a group of energy consuming loads.

Embodiments of the method of the invention may be comprised of making a decision relating to the management of an energy consuming load in a group of energy consuming loads, which decision is made without negotiating with the other loads, but which is made using information about the other loads. In some embodiments, the decision may be made independently of the other energy consuming loads without negotiating with the other loads, but using information about the other loads.

Embodiments of the method of the invention may also be comprised of making decisions relating to the management of a group of energy consuming loads, wherein a separate decision is made for each load and wherein the decisions are made without negotiation amongst the loads, but using information about the loads which is shared amongst the loads. In some embodiments, the separate decisions may be made independently of each other without negotiation amongst the loads, but using information about the loads which is shared amongst the loads.

Embodiments of the method of the invention may be comprised of managing an enablement state of an energy consuming load by generating information about the load and using the generated information to adjust an assigned duty cycle which has been assigned to the load.

Embodiments of the apparatus of the invention may include structures and/or devices which facilitate sharing of information amongst a group of energy consuming loads, making a decision relating to the management of one of the loads using the shared information, and implementing the decision.

Embodiments of the apparatus of the invention may include structures and/or devices which facilitate generating information about an energy consuming load, and using the generated information to adjust an assigned duty cycle which has been assigned to the load.

Embodiments of the apparatus of the invention may also include a processor which facilitates generating information about an energy consuming load in a group of energy consuming loads, compiling information about the group of energy consuming loads and making a decision relating to the management of the load using the compiled information, and/or which facilitates generating information about an energy consuming load and using the generated information to adjust an assigned duty cycle which has been assigned to the load.

Embodiments of the computer readable medium of the invention may provide computer readable instructions for directing the processor.

In a first method aspect, the invention is a method for managing a group of energy consuming loads comprising a plurality of loads, the method comprising:

(a) generating a set of load state data from each of the loads in the group of loads, wherein at least one of the loads in the group of loads is comprised of a discretionary load, wherein each of the loads in the group of loads has a duty cycle, and wherein the duty cycle for at least one of the discretionary loads is less than 100 percent;
 (b) making an enablement state decision for each of the loads using the sets of load state data from the loads, wherein each of the enablement state decisions reflects an enablement state of a corresponding load in the group of loads, wherein the enablement state is either a load enabled state or a load disabled state, wherein the load enabled state is a state where the corresponding load is capable of operating even when the corresponding load is not actually operating, and wherein the load disabled state is a state where the corresponding load is not capable of operating; and
 (c) implementing the enablement state decisions.

In a second method aspect, the invention is a method for managing an energy consuming load in a group of energy consuming loads comprising the load and a plurality of other loads, the method comprising:

(a) generating a set of load state data from the load, wherein the load is comprised of a discretionary load, wherein the load has a duty cycle and wherein the duty cycle for the load is less than 100 percent;
 (b) compiling the set of load state data generated from the load with sets of load state data generated from the other loads;
 (c) making an enablement state decision for the load using the compiled sets of load state data, wherein the enablement state decision reflects an enablement state of the load, wherein the enablement state is either a load enabled state or a load disabled state, wherein the load enabled state is a state where the load is capable of operating even when the load is not actually operating, and wherein the load disabled state is a state where the load is not capable of operating; and
 (d) implementing the enablement state decision for the load.

In a third method aspect, the invention is a method for managing an enablement state of an energy consuming load, wherein the enablement state is either a load enabled state or a load disabled state, wherein the load enabled state is a state where the load is capable of operating even when the load is not actually operating, and wherein the load disabled state is a state where the load is not capable of operating, the method comprising:

(a) assigning an assigned duty cycle to the load which represents a percentage of time that the load is in the load enabled state;
(b) determining a load enabled utilization value for the load, wherein the load enabled utilization value provides an indication of an extent to which the load is actually operating while the load is in the load enabled state; and
(c) adjusting the assigned duty cycle for the load using the load enabled utilization value.

In a first apparatus aspect, the invention is an apparatus for managing an energy consuming load in a group of energy consuming loads comprising the load and a plurality of other loads, the apparatus comprising:
(a) a transmitter configured to transmit a set of load state data generated from the load;
(b) a receiver configured to receive sets of load state data generated from the other loads;
(c) a processor configured to generate the set of load state data from the load, to compile the set of load state data from the load with the sets of load state data from the other loads, and to process the compiled sets of load state data in order to make an enablement state decision for the load, wherein the enablement state decision reflects an enablement state of the load, wherein the enablement state is either a load enabled state or a load disabled state, wherein the load enabled state is a state where the load is capable of operating even when the load is not actually operating, and wherein the load disabled state is a state where the corresponding load is not capable of operating; and
(d) a controller for implementing the enablement state decision.

In a second apparatus aspect, the invention is an apparatus for making an enablement state decision reflecting an enablement state of an energy consuming load in a group of energy consuming loads comprising the load and a plurality of other loads, wherein the enablement state is either a load enabled state or a load disabled state, wherein the load enabled state is a state where the load is capable of operating even when the load is not actually operating, and wherein the load disabled state is a state where the load is not capable of operating, the apparatus comprising a processor programmed to:
(a) generate a set of load state data from the load;
(b) compile the set of load state data from the load with sets of load state data from the other loads; and
(c) process the compiled sets of load state data in order to make the enablement state decision.

In a third apparatus aspect, the invention is an apparatus for managing an enablement state of an energy consuming load, wherein the enablement state is either a load enabled state or a load disabled state, wherein the load enabled state is a state where the load is capable of operating even when the load is not actually operating, and wherein the load disabled state is a state where the load is not capable of operating, the apparatus comprising a processor programmed to:
(a) assign an assigned duty cycle to the load which represents a percentage of time that the load is in the load enabled state;
(b) determine a load enabled utilization value for the load, wherein the load enabled utilization value provides an indication of an extent to which the load is actually operating while the load is in the load enabled state; and
(c) adjust the assigned duty cycle for the load using the load enabled utilization value.

In a first computer readable medium aspect, the invention is a computer readable medium providing computer readable instructions for directing a processor to make an enablement state decision reflecting an enablement state of an energy consuming load in a group of energy consuming loads comprising the load and a plurality of other loads, wherein the enablement state is either a load enabled state or a load disabled state, wherein the load enabled state is a state where the load is capable of operating even when the load is not actually operating, and wherein the load disabled state is a state where the load is not capable of operating, the instructions comprising:
(a) generating a set of load state data from the load;
(b) compiling the set of load state data from the load with sets of load state data from the other loads; and
(c) processing the compiled sets of load state data in order to make the enablement state decision.

In a second computer readable medium aspect, the invention is a computer readable medium providing computer readable instructions for directing a processor to manage an enablement state of an energy consuming load, wherein the enablement state is either a load enabled state or a load disabled state, wherein the load enabled state is a state where the load is capable of operating even when the load is not actually operating, and wherein the load disabled state is a state where the load is not capable of operating, the instructions comprising:
(a) assigning an assigned duty cycle to the load which represents a percentage of time that the load is in the load enabled state;
(b) determining a load enabled utilization value for the load, wherein the load enabled utilization value provides an indication of an extent to which the load is actually operating while the load is in the load enabled state; and
(c) adjusting the assigned duty cycle for the load using the load enabled utilization value.

The invention is used to manage the enablement state of one or more energy consuming loads. The enablement state of the energy consuming loads is either a load enabled state or a load disabled state.

A load enabled state may be a state where the load is actually operating (i.e., "running"). Alternatively, a load enabled state may be a state where the load is capable of operating, even if it is not actually operating. Preferably, a load enabled state is a state where the load is capable of operating, even if it is not actually operating. In preferred embodiments, a load enabled state is achieved either by providing an enabled control line circuit so that control signals can be transmitted to the load or by providing an enabled energization circuit so that energy is available to the load.

Similarly, a load disabled state may be a state where the load is not operating, or may be a state where the load is not capable of operating. Preferably, a load disabled state is a state where the load is not capable of operating. In preferred embodiments a load disabled state is achieved either by providing a disabled control line so that control signals cannot be transmitted to the load or by providing disabled energization source so that energy is not available to the load.

The energy consuming loads may consume any form of energy, either directly or indirectly. For example, the energy consuming loads may directly consume natural gas, propane or electricity, and may indirectly consume coal, oil, atomic energy or hydroelectric energy. In preferred embodiments the energy consuming loads are electrical loads which directly consume electricity which is generated from other sources of energy.

The invention may be used to manage the state of the loads for any purpose. For example, the purpose of managing the state of the loads may be to reduce energy consumption, to provide for an energy consumption schedule, to reduce energy demand or to provide for an energy demand schedule. In preferred embodiments the purpose of managing the state of the loads is to control the peak energy demand (i.e., peak electricity demand) of the group of loads.

The energy consuming loads may be comprised of any type of load which consumes the form of energy which is of interest in the practice of the invention. For example, where the form of energy is natural gas or propane, the energy consuming loads may be comprised of heaters, furnaces, ranges etc. or any other type of device or apparatus which consumes natural gas or propane, and where the form of energy is electricity, the energy consuming loads may be comprised of any type of device or apparatus which consumes electricity, including but not limited to heaters, air conditioners, coolers, refrigerators, freezers, fans, lights, appliances, computing devices etc.

The energy consuming loads may consume more than one form of energy. For example, a furnace may consume natural gas or propane in order to generate heat, but may also consume electricity to power a fan associated with the furnace. Where an energy consuming load consumes more than one form of energy, the form of energy of interest may be one or more of the forms of energy which are consumed by the load.

A duty cycle is the percentage of time that a load is in the load enabled state as opposed to the load disabled state. If the duty cycle is 100 percent, the load is always in the load enabled state (i.e., the load is never in the load disabled state). If the duty cycle is 0 percent, the load is never in the load enabled state (i.e., the load is always in the load disabled state).

A duty cycle may be a natural duty cycle. A natural duty cycle may define the percentage of time that the load must operate within its environment in order to provide a particular result. For example, having regard to the environment in which a heater is installed, the heater may be required to operate 50 percent of the time in order to maintain the temperature of a space within a desired range. In such circumstances, the natural duty cycle of the heater could be described as being 50 percent. Alternatively, a natural duty cycle may define an amount of energy consumed by the load during a time period relative to an amount of energy that the load would consume if it operated continuously during the time period.

A duty cycle may also be an assigned duty cycle which may be less than or greater than the natural duty cycle of the load. An assigned duty cycle may, for example, be assigned to be less than the natural duty cycle in order to reduce energy consumption, and may be assigned to be greater than the natural duty cycle in order to provide increased assurance that the load will satisfy its assigned objectives.

In the practice of the invention, the duty cycle for each of the loads may be its natural duty cycle or may be an assigned duty cycle. The duty cycles for the loads may also be variable, either due to changes in the natural duty cycles of the loads or due to changes in the assigned duty cycles of the loads.

In some embodiments, a load may be configured to operate according to a natural duty cycle and the load may also be assigned an assigned duty cycle. The natural duty cycle and the assigned duty cycle may be separately variable. In some embodiments, the operation of the load according to the natural duty cycle for the load may be constrained by the assigned duty cycle for the load, since the implementation of the natural duty cycle and the assigned duty cycle may not completely coincide and the assigned duty cycle may inhibit the load from operating in accordance with its natural duty cycle.

In some embodiments, the natural duty cycle may represent the percentage of time that the load must actually operate within its environment in order to provide a particular result. In some embodiments, the load may be associated with a control system so that the natural duty cycle and/or the operation of the load according to the natural duty cycle is determined and/or varied with or by the control system. For example, if the load is a heater, the control system may be comprised of a thermostat so that the heater may be configured to operate to provide and/or maintain a particular temperature in a space, wherein the particular temperature may be varied with the control system.

In some embodiments, the assigned duty cycle may represent the percentage of time that the load is capable of operating even when the load is not actually operating, so that the load enabled state in the context of the assigned duty cycle is a state in which the load is capable of operating even when the load is not actually operating. In some embodiments, the assigned duty cycle may be assigned to the load or adjusted directly. In some embodiments, the assigned duty cycle may be assigned to the load or adjusted indirectly. In some embodiments, the assigned duty cycle may be assigned to the load or adjusted indirectly using an apparatus which is associated with the load.

As a result, in some embodiments, a load may operate simultaneously according to a natural duty cycle and an assigned duty cycle, wherein the natural duty cycle and the assigned duty cycle may be the same as or different from each other and may be separately variable. The load may strive to operate according to the natural duty cycle in order to provide a particular result, while the assigned duty cycle will prevent the load from operating unless the load is in the load enabled state. As a result, the operation of the load according to the natural duty cycle may be constrained by the assigned duty cycle.

The energy consuming loads may be comprised of non-discretionary loads and/or discretionary loads. A non-discretionary load is a load which must always be enabled, which must be enabled rigidly according to a schedule, which must be enabled rigidly according to a fixed set of constraints such as temperature, humidity etc., or which must always be available to be enabled when called upon.

A discretionary load is a load for which there is some flexibility in operating within a schedule or within a set of constraints, as long as the load is capable of achieving its duty cycle. For example, if a heater is set normally to turn on when a temperature within a space is 20 degrees Celsius, and the turning on of the heater may be delayed so that the heater turns on when the temperature within the space is somewhat less than 20 degrees Celsius, the load may be described as a discretionary load.

A non-discretionary load may also be a load which is in a monitoring mode. In monitoring Mode, the load is permitted to operate according to its duty cycle without intervention from the invention. As a result, in monitoring mode, an otherwise discretionary load may be considered to be a non-discretionary load.

Each enablement state decision is made using load state data from the loads in the group of energy consuming loads. Preferably a set of load state data is generated for each of the loads. Preferably the enablement state decision is Made using sets of load state data from all of the loads. An enablement state decision may, however, be made using sets of load state data from fewer than all of the loads if one or more sets of load state data are unavailable, incomplete or unreliable.

In some embodiments, the determination of the load enabled utilization value for a load may be made using load state data from the load. In some embodiments, the determination of the load enabled utilization value for a load may be made using a plurality of sets of load state data from the load.

Each set of load state data is comprised of information about a corresponding load. The information May be comprised of identifying information, operational information or any other information which may assist in making the enablement state decision for any of the loads and/or any other information which may assist in determining the load enabled utilization value for a load.

Non-limiting examples of identifying information include information for identifying the load and/or information for identifying the time to which the load state data relates. Non-limiting examples of operational information include information relating directly or indirectly to the duty cycle of the load, the energy demand of the load, the extent to which the duty cycle has been satisfied by the load, and/or the extent to which the load contributes to a target system equilibrium of the group of loads.

Further non-limiting examples of operational information include the amount of energy consumed by the load while the load is in the load enabled state, the amount of time that the load is actually operating while the load is in the load enabled state, and any other information which may assist in determining the load enabled utilization value for the load. The amount of energy consumed by the load while the load is in the load enabled state may be represented by a single measurement of the energy demand of the load, by an average energy demand of the load, by a peak energy demand of the load, or by a representation of energy demand over time.

The purpose of the sets of load state data is to provide information about the loads, which information is used to make the enablement state decisions and which may be used to determine the load enabled utilization values for the loads.

In preferred embodiments, each set of load state data is comprised of a load identifying indication for identifying the load, a time indication for identifying the time to which the load state data relates, an energy demand indication relating to the energy demand of the load, an enablement need indication relating to the extent to which the duty cycle of the load has been satisfied by the load, and a duty cycle indication relating directly or indirectly to the duty cycle of the load.

In some embodiments, each set of load state data may additionally or alternatively be comprised of an energy consumption indication of the amount of energy consumed by the load while the load is in the load enabled state, an operating time indication of the amount of time that the load is actually operating while the load is in the load enabled state, and/or any other information which may assist in determining the load enabled utilization value for the load.

In particular preferred embodiments, the duty cycle indication is used to determine the extent to which the load contributes to a target system equilibrium for the group of loads. As a result the duty cycle indication may relate directly to the duty cycle of the load so that the contribution of the load to the target system equilibrium can be calculated from the duty cycle indication of the load and the energy demand indication of the load. Alternatively, the duty cycle indication may relate indirectly to the duty cycle of the load so that the duty cycle indication is expressed as the contribution of the load to the target system equilibrium.

In some embodiments, the sets of load state data from the loads are used to make an enablement state decision for each of the loads. Using the sets of load state data may be comprised of compiling the sets of load state data which are generated from the loads.

Preferably the enablement state decisions for each of the loads are made using the same sets of load state data. Preferably the enablement state decisions for each of the loads are made by processing the sets of load state data using the same rules. However, each of the enablement state decisions is made without negotiation amongst the loads. In some embodiments, the enablement state decisions may be made independently of each other without negotiation amongst the loads and without regard to enablement state decisions affecting other loads.

Preferably at least one of the loads in the group of loads is comprised of a discretionary load. Preferably at least one of the loads in the group of loads has a duty cycle which is less than 100 percent. Preferably at least one of the discretionary loads in the group of loads has a duty cycle which is less than 100 percent.

In some embodiments, the duty cycle for each of the loads may be an assigned duty cycle which represents a percentage of time that the load is capable of operating even when the load is not actually operating.

In some embodiments, the at least one discretionary load in the group of loads is configured to operate according to a natural duty cycle, which represents a percentage of time that the at least one discretionary load must actually operate in order to provide a particular result. In some embodiments, the natural duty cycle for the at least one discretionary load may be less than 100 percent.

In embodiments in which the loads are assigned an assigned duty cycle and in which one or more loads may be configured to operate according to a natural duty cycle, the operation of the loads according to the natural duty cycles for the loads may be constrained by the assigned duty cycles for the loads.

Preferably the enablement state decisions are made with a goal of achieving a target system equilibrium for the group of loads. Preferably the target system equilibrium represents an energy demand for the group of loads which approaches an average energy demand for the group of loads. In preferred embodiments the target system equilibrium is equal to a sum for all of the loads in the group of loads of a product of the energy demand of one of the loads and the duty cycle of the one of the loads. The contribution of a load to the target system equilibrium is the product of the energy demand of the load and the duty cycle of the load.

Each of the loads in the group of loads may have an enablement need in order to achieve its duty cycle. The enablement need may be based upon an amount of time in which the load has been in the load enabled state, upon an amount of time remaining for the load to achieve its duty cycle, and upon the duty cycle of the load. As a result, the enablement need describes the "urgency" of the need for the load to be placed in the load enabled state.

In preferred embodiments, the enablement state decisions for the loads are constrained by the enablement needs of the loads. For example, the enablement state decision for a load which is at risk of not achieving its duty cycle may be more likely to indicate the load enabled state than the enablement state decision for a load which is not at risk of not achieving its duty cycle. In such circumstances, each of the sets of load state data is preferably comprised of an enablement need indication of the enablement need of the corresponding load.

The enablement state decisions for the loads are particularly constrained by the enablement needs of non-discretionary loads. Where non-discretionary loads are included in the group of loads, the enablement needs of the non-discretionary loads may dictate the enablement state decisions for those loads and/or the implementation of the enablement state decisions for those loads.

For example, if a non-discretionary load must always be enabled or must always be enabled when called upon, the non-discretionary load may be required always to be in the load enabled state. If a non-discretionary load must be enabled rigidly according to a particular schedule, the non-discretionary load may be required to be in the load enabled state at particular times.

These results can be achieved by tailoring the sets of load state data for non-discretionary loads to reflect the enablement needs of the non-discretionary loads. For example, a non-discretionary load may be assigned a duty cycle of 100 percent in order to ensure that the enablement state decision provides that the load is always enabled. Alternatively, the enablement need of a non-discretionary load may be set so that the amount of time which is required in order for the non-discretionary load to achieve its duty cycle is greater than or equal to the time remaining for the load to achieve its duty cycle.

Additionally or alternatively, these results may be achieved by tailoring the implementation of the enablement state decisions for non-discretionary loads. For example, the implementation of an enablement state decision for a non-discretionary load may comprise placing or maintaining the load in the load enabled state regardless of the enablement state decision. This approach effectively "overrides" an enablement state decision which would place the load in a load disabled state.

In preferred embodiments, the enablement state decisions are also constrained by the energy demands of the loads. For example, the enablement state decision for a load which will not cause the target system equilibrium for the group of loads to be exceeded if the load is placed in the load enabled state may be more likely to indicate the load enabled state than the enablement state decision for a load which will cause the target system equilibrium to be exceeded if the load is placed in the load enabled state. In such circumstances, each of the sets of load state data is preferably comprised of an energy demand indication and a duty cycle indication.

The enablement state decisions are preferably made in a decision making sequence. The decision making sequence is preferably dependent upon the information contained in the sets of load state data.

As a first example, the decision making sequence may be dependent upon the enablement needs of the loads, so that the enablement state decision for a load having a relatively higher enablement need is made before the enablement state decision for a load having a relatively lower enablement need. In such circumstances, each of the sets of load state data is preferably comprised of an enablement need indication of the enablement need of the corresponding load.

As a second example, each of the loads has an energy demand, which energy demand represents the rate at which the load will consume energy when it is operating. Preferably the energy demand represents the maximum rate at which the load is expected to consume energy when it is operating. The decision making sequence may be dependent upon the energy demands of the loads, so that the enablement state decision for a load having a relatively higher energy demand is made before the enablement state decision for a load having a relatively lower energy demand. In such circumstances, each of the sets of load state data is preferably comprised of an energy demand indication of the energy demand of the load.

The method of the invention may be comprised of making a single enablement state decision for each of the loads based upon a single set of load state data generated from each of the loads. Preferably, however, the method is performed repeatedly in accordance with a schedule.

The schedule is preferably comprised of at least one period. Preferably the schedule is comprised of a plurality of periods. Each period is preferably comprised of a plurality of segments so that each period is divided into segments. Preferably the method is performed once during each segment of each period.

In preferred embodiments, the duty cycles of the loads are defined having regard to the periods so that the enablement need of each of the loads is defined by a remaining number of segments in the period during which the load must be in the load enabled state in order to achieve its duty cycle.

As a result, in preferred embodiments the sets of load state data generated during each segment in a period relate to the loads in the context of the period and are somewhat interrelated by the determination of the enablement needs of the loads.

The period may be any length of time. The period may be divided into any number of segments. The length of the period and the number of segments within the period are dependent upon the speed with which the method can be performed and upon the desired degree of control over the loads that is sought. By way of non-limiting example, in preferred embodiments the period is between about two hours and three hours and the number of segments in each period is twelve, so that in preferred embodiments the length of each segment is between about ten minutes and about fifteen minutes.

In some apparatus aspects of the invention which comprise a controller, the controller may be comprised of any structure, device or apparatus which is capable of implementing the enablement state decision. In preferred embodiments the controller is comprised of a control circuit and a switch. The control circuit is associated with the processor and the switch is located within the control circuit.

The load may be connected within an energization circuit and the switch may be actuatable so that the energization circuit is closed when the load is in the load enabled state and so that the energization circuit is open when the load is in the load disabled state. The energization circuit is comprised of an energy source for the load. In preferred embodiments the energy source is an electrical energy source.

The load may alternatively be connected within a control line circuit and the switch may be actuatable so that the control line circuit is closed when the load is in the load enabled state and so that the control line circuit is open when the load is in the load disabled state (or the switch may alternatively be actuatable so that the control line circuit is open when the load is in the load enabled state and so that the control line circuit is closed when the load is in the load disabled state). The control line circuit may be configured to provide any type of control signal or signals for controlling the load, including electrical control signals, optical control signals, acoustic control signals, pneumatic control signals, hydraulic control signals etc. In preferred embodiments the control line circuit is comprised of an electrical control line and provides electrical control signals to the load.

The switch may be comprised of any structure, device or apparatus which is compatible with the energization circuit and/or the control line circuit. The nature of the switch may therefore be dependent upon the nature of the energy supply system and/or upon the manner in which the load is normally controlled. The nature of the switch may therefore also be dependent upon the nature of the energization circuit and the control line circuit.

For example, where the energy supply system is an electrical system or where the loads are controlled by a control line circuit comprising an electrical control line, each switch may be comprised of an electrical switch. The electrical switch may be comprised of a relay or any other suitable electrical switch. In other embodiments, the switch may be comprised of a valve for controlling the energization circuit and/or the control line circuit. The valve may be comprised of any suitable valve, including a hydraulic valve or a pneumatic valve.

In preferred embodiments the control circuit preferably functions either to disconnect the load from an electrical energy source or to disconnect the load from a control line circuit comprising an electrical control line which provides low voltage electrical control signals to the load.

The transmitter and/or the receiver may be comprised of any suitable type of structure, device or apparatus. For example, the transmitter and/or the receiver may be wired or wireless, and the transmitter and/or receiver may be comprised of a radio frequency device, an infrared device, an acoustical device, an optical device etc. Preferably the transmitter and/or receiver are comprised of radio frequency devices. Preferably the transmitter and/or receiver are wireless devices. The transmitter and/or receiver may be configured to operate in accordance with any suitable communication protocol. In preferred embodiments the transmitter and/or receiver are configured to comply substantially with an IEEE 802.15.4 standard.

The apparatus of the invention may be further comprised of a sensor device for sensing the energy demand of the load which is associated with the apparatus. The sensor device may be comprised of any type of sensor device which is suitable for sensing the energy demand of the load. Where the load is comprised of an electrical load, the sensor device is comprised of an electrical energy sensor device.

The apparatus of the invention may be further comprised of a battery for providing electrical power to the apparatus. The battery may be comprised of a rechargeable battery, and the apparatus may be further comprised of a recharge circuit for recharging the battery.

In preferred embodiments, the recharge circuit for the rechargeable battery may be comprised of the electrical energy sensor device. For example, the electrical energy sensor device may be comprised of a transformer which senses electrical energy in the energization circuit by producing induced electrical energy in a secondary circuit. The secondary circuit may be connected within the recharge circuit so that the induced electrical energy in the secondary circuit is used to recharge the rechargeable battery.

The apparatus of the invention may be further comprised of a device for adjusting the duty cycle of the load which is used in the method of the invention. The duty cycle may be adjusted in any manner, such as to provide an assigned duty cycle for the load, provide a default duty cycle for the load, restore a natural duty cycle of the load, or reset the duty cycle of the load to a reset value of the duty cycle. The apparatus of the invention may be further comprised of a visual display for providing a visual representation of the duty cycle of the load, which visual representation may include the natural duty cycle of the load, the assigned duty cycle of the load, historical information regarding the duty cycle of the load etc.

In some computer readable medium aspects of the invention, the instructions provided by the computer readable medium may be further comprised of directing a controller to implement the enablement state decision for the load. Similarly, in some apparatus aspects of the invention which comprise the processor, the processor may be programmed to direct a controller to implement the enablement state decision for the load.

Some method, apparatus and computer readable medium aspects of the invention are directed more specifically at procedures for adjusting an assigned duty cycle which has been assigned to an energy consuming load. In some method embodiments of such aspects, the method may be comprised of assigning the assigned duty cycle to the load, determining a load enabled utilization value for the load, and adjusting the assigned duty cycle using the load enabled utilization value. In some apparatus embodiments of such aspects, the apparatus may be comprised of a processor which is programmed to perform all or portions of the procedures for adjusting the assigned duty cycle. In some computer readable medium embodiments of such aspects, the computer readable medium may provide computer readable instructions for directing a processor to perform all or portions of the procedures for adjusting the assigned duty cycle.

In some embodiments of such aspects of the invention, a balance may be desired between enabling the load to operate substantially in accordance with its natural duty cycle while minimizing the assigned duty cycle which is assigned to the load, thereby potentially increasing the efficiency of the overall method for managing one or more energy consuming loads and/or facilitating an ability of the overall method to adapt to varying natural duty cycles of the energy consuming loads. In some embodiments of such aspects of the invention, a goal may be to optimize an assigned duty cycle for a load so that the assigned duty cycle approximates the natural duty cycle for the load. In some embodiments of such aspects of the invention, a goal may be to minimize the extent to which the operation of a load according to the natural duty cycle for the load is constrained by the assigned duty cycle for the load.

In some such embodiments, a load enabled state is a state where the load is capable of operating even when the load is not actually operating. In some such embodiments, the load may be configured to operate according to a natural duty cycle which represents a percentage of time that the load must actually operate in order to provide a particular result. In some such embodiments, the load may be a discretionary load. In some such embodiments, the load may have a natural duty cycle which is less than 100 percent. In some such embodiments, the load may have an assigned duty cycle which is less than 100 percent. In some such embodiments, the operation of the load according to the natural duty cycle for the load may be constrained by the assigned duty cycle for the load.

In some embodiments, the load enabled utilization value may be comprised of any indication of the extent to which the load is actually operating while the load is in the load enabled state.

In some embodiments, the load enabled utilization value may be related to the amount of time that the load is actually operating while the load is in the load enabled state. In some embodiments, the load enabled utilization value may be related to the amount of energy consumed by the load while the load is in the load enabled state. In some embodiments, the load enabled utilization value may be provided as a ratio.

In some embodiments, the load enabled utilization value may be comprised of a ratio of an amount of energy consumed by the load while the load is in the load enabled state to an amount of energy which would be consumed by the load if the load were actually operating at all times while the load is in the load enabled state. In some embodiments, determining the load enabled utilization value may be comprised of measuring the amount of energy consumed by the load while the load is in the load enabled state. In some embodiments, the amount of energy consumed by the load may be measured using the sensor device.

The amount of energy consumed by the load while the load is in the load enabled state may be expressed as a rate of energy consumption (i.e., energy demand) or as a total amount of energy consumed. A rate of energy consumption may be expressed from one or more measured or estimated values of energy demand, from an average value of energy demand, from a maximum value of energy demand, or from any other suitable indication of rate of energy consumption. A total amount of energy consumed may be expressed as a sum or integral of a suitable expression of rate of energy consumption over time.

The amount of energy which would be consumed by the load if the load were actually operating at all times while the load is in the load enabled state may be expressed as a rate of energy consumption (i.e., energy demand) or as a total amount of energy consumed. A rate of energy consumption may be expressed from one or more measured or estimated values of energy demand, from an average value of energy demand, from a maximum value of energy demand, or from any other suitable indication of rate of energy consumption. A total amount of energy consumed may be expressed as a sum or integral of a suitable expression of rate of energy consumption over time.

In some embodiments, the amount of energy which is consumed by the load while the load is in the load enabled state may be expressed as a total amount of energy which is consumed by the load. In some embodiments, the total amount of energy which is consumed by the load while the load is in the load enabled state may be expressed as a sum or integral of actual measured values of energy demand over the time that the load is in the load enabled state.

In some embodiments, the amount of energy which would be consumed by the load if the load were actually operating at all times while the load is in the load enabled state may be expressed as a total amount of energy which would be consumed by the load while the load is in the load enabled state. In some embodiments, the total amount of energy which would be consumed by the load if the load were actually operating at all times while the load is in the load enabled state may be expressed as a sum or integral of peak values of energy demand over the time that the load is in the load enabled state.

In some embodiments, the load enabled utilization value may be comprised of a ratio of an amount of time that the load is actually operating while the load is in the load enabled state to an amount of time that the load is in the load enabled state. In some embodiments, determining the load enabled utilization value may be comprised of measuring the amount of time that the load is actually operating while the load is in the load enabled state. In some embodiments, the amount of time that the load is actually operating may be measured with the processor. In some embodiments, the amount of time that the load is actually operating may be measured with a timing device.

The assigned duty cycle for the load may be adjusted by increasing the assigned duty cycle, decreasing the assigned duty cycle, or by maintaining the current assigned duty cycle.

In some embodiments, the assigned duty cycle for the load may be adjusted by increasing the assigned duty cycle when the load enabled utilization value is above an upper limit. In some embodiments, the upper limit may be fixed. In some embodiments, the upper limit may be variable. In some embodiments, the upper limit may be a ratio which is less than, but close to about 1:1, so that the assigned duty cycle is increased only when the assigned duty cycle is nearly completely utilized. The assigned duty cycle for the load may be increased by any suitable amount when the load enabled utilization value is above the upper limit.

In some embodiments, the assigned duty cycle for the load may be adjusted by decreasing the assigned duty cycle when the load enabled utilization value is below a lower limit. In some embodiments, the lower limit may be fixed. In some embodiments, the lower limit may be variable. In some embodiments, the lower limit may be established having regard to one or more considerations including but not limited to the desired efficiency and optimization of the method and the desired aggressiveness for managing the load. The assigned duty cycle for the load may be decreased by any suitable amount when the load enabled utilization value is below the lower limit.

In some embodiments, the upper limit of the load enabled utilization value and the lower limit of the load enabled utilization value may define a target range for the load enabled utilization value.

In some embodiments, when the load enabled utilization value is above the upper limit, the assigned duty cycle may be increased by an amount so that the next determined load enabled utilization value may be expected to be within the target range. In some embodiments, the assigned duty cycle may be increased by an amount so that the next determined load enabled utilization value may be expected to be at a desired position within the target range.

In some embodiments, when the load enabled utilization value is below the lower limit, the assigned duty cycle may be decreased by an amount so that the next determined load enabled utilization value may be expected to be within the target range. In some embodiments, the assigned duty cycle may be decreased by an amount so that the next determined load enabled utilization value may be expected to be at a desired position within the target range.

In some embodiments, when the load enabled utilization value is above the upper limit, the assigned duty cycle may be increased by a defined increment. In some embodiments, when the load enabled utilization value is below the lower limit, the assigned duty cycle may be decreased by a defined decrement. The defined increment and/or the defined decrement may be the same or different and may be constant or variable.

In some embodiments, the assigned duty cycle may be adjusted in accordance with a schedule. In some embodiments, the schedule may be comprised of at least one period. In some embodiments, the assigned duty cycle may be adjusted for a period. In some embodiments, the period may be comprised of a plurality of segments. In some embodiments, the load is either in a load enabled state or a load disabled state during each of the segments.

In some embodiments, adjusting the assigned duty cycle may be further comprised of generating a set of load state data from the load for each segment in the period in which the load is in a load enabled state. In some embodiments, each set of load state data may be comprised of an indication of an extent to which the load is actually operating during the segment.

In some embodiments, the load enabled utilization value may be determined for a single segment from the set of load state data generated for the segment. In some embodiments, the load enabled utilization value may be determined for a period from the sets of load state data generated during the period.

In some embodiments, the load enabled utilization value may be determined for a plurality of segments from the sets of load state data generated for the segments. In some embodiments, the number of segments for which the load enabled utilization value is determined may be variable. In some embodiments, the number of segments for which the load enabled utilization value is determined may be variable based upon one or more seasonal and/or historical criteria.

In some embodiments, the segments for which the load enabled utilization value is determined may be segments from different periods. In some embodiments, the segments for which the load enabled utilization value is determined may be segments from adjacent periods. In some embodiments, the segments for which the load enabled utilization value is determined may be a number of adjacent segments, wherein the adjacent segments may be segments from a single period or may be segments from a plurality of periods.

In some embodiments, the assigned duty cycle may be adjusted during a period at the conclusion of a segment. In some embodiments, the assigned duty cycle may be adjusted during a period at the conclusion of the period. In some embodiments, the assigned duty cycle may be adjusted at the conclusion of a plurality of segments, which may or may not coincide with the conclusion of a period.

In some embodiments, the schedule may be comprised of a plurality of periods. In some embodiments, the assigned duty cycle may be adjusted repeatedly throughout the periods.

In some embodiments in which the assigned duty cycle is adjusted by a defined increment and/or a defined decrement, the defined increment and/or the defined decrement for the assigned duty cycle may be related to the schedule. In some embodiments, the defined increment and/or the defined decrement may be related to the number of segments in a period. In some embodiments, the defined increment and the defined decrement may be defined as one or more segments within a period so that the assigned duty cycle may be increased or decreased by a percentage equivalent to one or more segments as a proportion of the total period.

In some embodiments, a ceiling limit for the assigned duty cycle may be provided, wherein the ceiling limit defines the maximum assigned duty cycle which may be assigned to the load. In some embodiments, when the load enabled utilization value is above the upper limit and the assigned duty cycle is at the ceiling limit, the assigned duty cycle is not increased.

In some embodiments, a floor limit for the assigned duty cycle may be provided, wherein the floor limit defines the minimum assigned duty cycle which may be assigned to the load. In some embodiments, when the load enabled utilization value is below the lower limit and the assigned duty cycle is at the floor limit, the assigned duty cycle is not decreased.

In its various aspects, the invention provides methods, apparatus, computer readable media and systems for use in managing one or more energy consuming loads in a group of energy consuming loads. The invention is based upon principles of emergence theory. As a result, the invention enables one or more loads in a group of loads to operate without negotiation amongst the loads, but using fundamental rules of behaviour which govern each of the loads.

In some embodiments, the loads may be managed independently of each other without negotiation amongst the loads, but using information about the loads which is shared amongst the loads.

In some embodiments, the loads may be managed independently of each other without negotiation amongst the loads, and without regard to enablement state decisions affecting other loads.

In some embodiments, each of the loads may be managed using an apparatus which is dedicated to the load so that each of the loads is managed using a separate apparatus. In some embodiments, the separate apparatus may be physically located in the vicinity of their associated loads. In some embodiments, the separate apparatus may be located remotely of the loads.

In some embodiments, a plurality of loads or all of the loads may be managed using a single apparatus. In some embodiments, the single apparatus may be physically located in the vicinity of one or more of its associated loads. In some embodiments, the single apparatus may be located remotely of its associated loads, such as in a centralized location in order to provide centralized management of the loads.

BRIEF DESCRIPTION OF DRAWINGS

Embodiments of the invention will now be described with reference to the accompanying drawings, in which.

DETAILED DESCRIPTION

Figure 1:
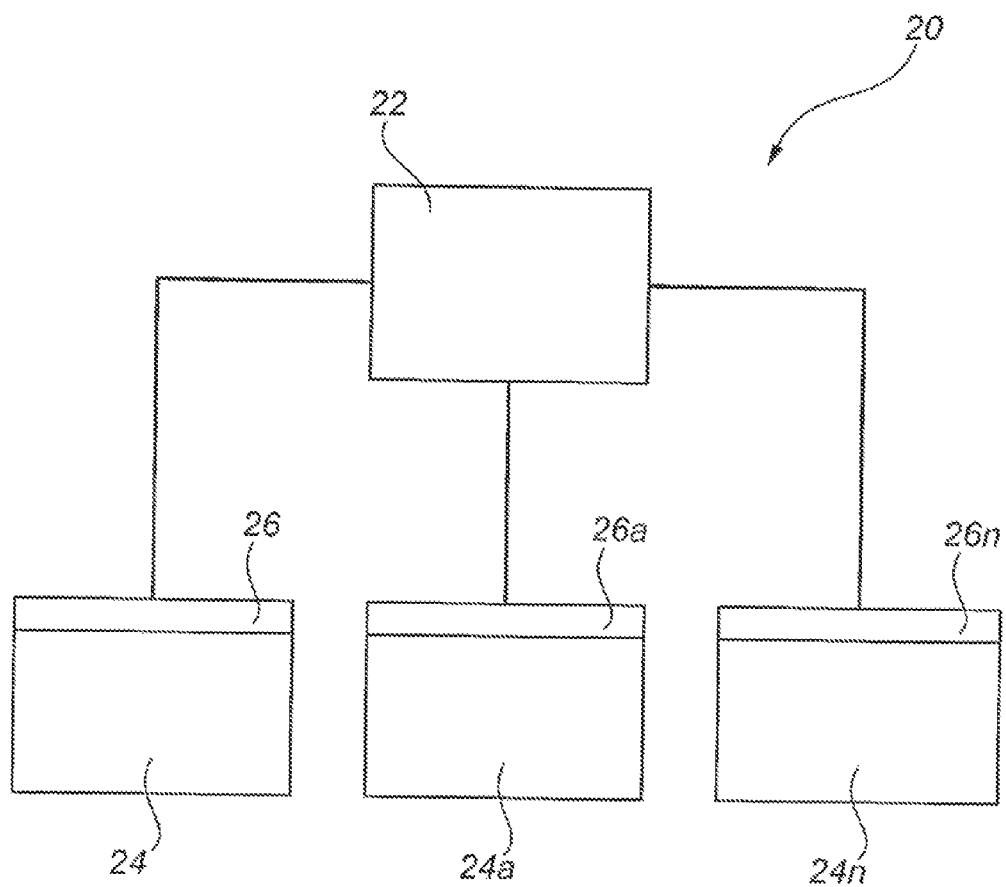
FIG. 1 is a schematic diagram of an energy supply system associated with a plurality of energy consuming loads, wherein each energy consuming load is connected with an apparatus of the present invention for managing the corresponding energy consuming load.

Referring to FIG. 1, a typical energy supply system (20) includes a energy source (22) and is associated with a plurality of energy consuming loads. An energy consuming load (24) is a device or apparatus which consumes energy and which therefore contributes both to the energy consumption of the energy supply system (20) and the energy demand of the energy supply system (20). The energy consuming loads may be organized into one or more groups of loads. Further, each of the loads, and groups of loads, may be connected or associated with the energy source (22) in any manner permitting the energy source (22) to provide the necessary or required energy to each of the loads.

The present invention is directed at an apparatus (26) for managing an energy consuming load (24) in a group of energy consuming loads comprising the energy consuming load (24) and a plurality of other energy consuming loads (24a ... 24n). In a preferred embodiment, the load (24) is connected or associated with the apparatus (26) for managing the energy consuming load (24). Further, each of the plurality of other loads (24a ... 24n) is also preferably connected or associated with an apparatus (26a ... 26n) for managing the corresponding other load (24a . . . 24n). In the preferred embodiment, each load (24) and each other load (24a . . . 24n) is comprised of an electrical load. In addition, each load (24) and each other load (24a . . . 24n) has an energy demand, being the rate at which the energy is consumed by the load (24) or the other load (24a . . . 24n) respectively.

Each apparatus (26) may be adapted or configured to be compatible with the particular load (24) or other load (24a . . . 24n) to which it is connected or with which it is associated. However, preferably, the components and configuration of each apparatus (26, 26a . . . 26n) is substantially similar and operates in a substantially similar manner. Thus, the following description of the apparatus (26) for connection with the load (24) is also applicable with respect to any additional apparatuses (26a . . . 26n) provided for managing the plurality of other loads (24a . . . 24n) in the group of energy consuming loads within the energy supply system (20).

Figure 2:
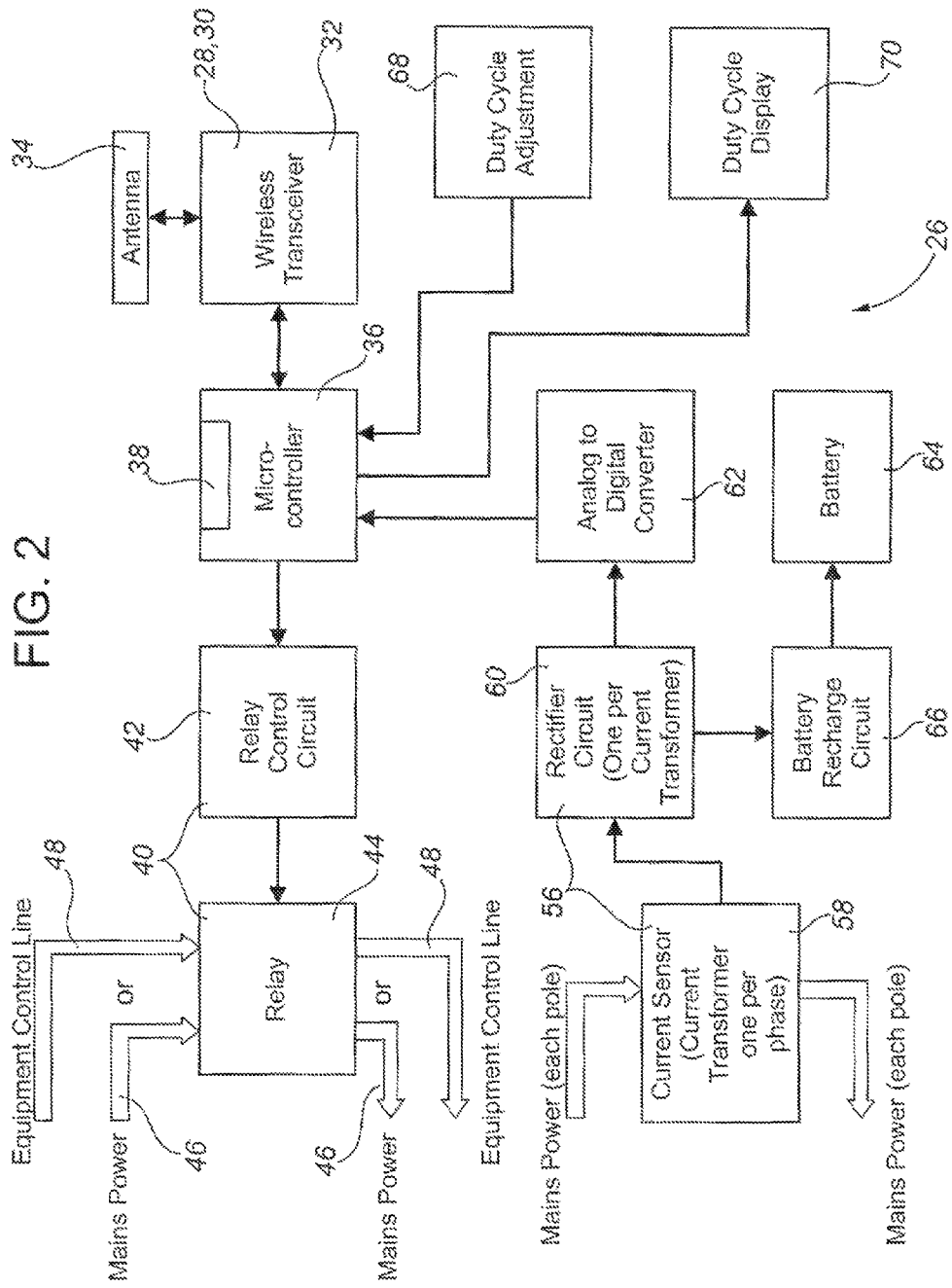
FIG. 2 is a detailed schematic diagram of a preferred embodiment of the apparatus shown in FIG. 1 provided for managing the corresponding energy consuming load.

Referring to FIG. 2, the apparatus (26) is preferably comprised of a transmitter (28) configured to transmit a set of load state data generated from the load (24) and a receiver (30) configured to receive sets of load state data generated from the other loads (24a . . . 24n). Although a separate transmitter and receiver may be provided, in the preferred embodiment, the transmitter (28) and the receiver (30) are comprised of a single transceiver (32). Any type or configuration of transceiver (32) capable of, and suitable for, transmitting and receiving the necessary load state data may be utilized. However, preferably, the transceiver (32) is a wireless transceiver. More particularly, in the preferred embodiment, the transceiver (32) is comprised of a radio frequency wireless transceiver (32) associated with an antenna (34) for transmitting and receiving the load state data. The wireless transceiver (32) may operate in accordance with any suitable or compatible communication protocol. Preferably, the wireless transceiver (32) is configured to comply substantially with an IEEE 802.15.4 standard. For example, a ZigBee™ compliant 2.4 GHz wireless platform may be utilized. ZigBee™ is a trade-mark of the ZigBee Alliance.

Further, the apparatus (26) is preferably comprised of a processor (36) configured to generate the set of load state data from the load (24), to compile the sets of load state data from the group of loads, and to process the compiled sets of load state data in order to make an enablement state decision for the load (24). In the preferred embodiment, the enablement state decision is made independently of the other loads (24a . . . 24n).

Thus, the processor (36) is associated or connected with the transceiver (32) such that the processor (36) may communicate with the other apparatuses (26a . . . 26n). Specifically, the processor (36) generates the set of load state data from the load (24) for transmission by the transceiver (32) to the other apparatuses (26a . . . 26n). Further, the processor (36) compiles the sets of load state data received by the transceiver (32) from the other apparatuses (26a . . . 26n). The processor (36) then utilizes the compiled sets of load state data from the group of loads in order to make an enablement state decision for the load (24).

The processor (36) may be comprised of any known or conventional computer, processing unit or computing device capable of performing the functions of the processor (36) as described herein, including the performance of the algorithms or sets of instructions necessary to permit the enablement state decision for the load (24) to be made by the processor (36).

Accordingly, in the preferred embodiment the processor (36) is preferably programmed to perform its functions, and specifically to generate the set of load state data from the load (24), to compile the set of load state data from the load (24) with sets of load state data from the other loads (24a . . . 24n) and to process the compiled sets of load state data in order to make an enablement state decision for the load (24) independently of the other loads (24a . . . 24n). In the preferred embodiment, the invention is further comprised of a computer readable medium (38) for providing computer readable instructions for directing the processor (36) to perform its functions as described herein.

As indicated, the enablement state decision reflects an enablement state of the load (24), wherein the enablement state is either a load enabled state or a load disabled state. In the preferred embodiment the enablement state decision for the load (24) is made independently of the enablement state decisions made for any of the other loads (24a . . . 24n). In the preferred embodiment, the load enabled state is a state in which the load (24) is capable of operating, while the load disabled state is a state in which the load is not capable of operating.

The apparatus (26) is also preferably comprised of a controller (40) for implementing the enablement state decision. Thus, the controller (40) is connected or associated with the processor (36) such that the enablement state decision made by the processor (36) may be communicated to the controller (40) for implementation.

Although the controller (40) may be comprised of any mechanism or device capable of implementing the enablement state decision, the controller (40) is preferably comprised of a control circuit (42) and a switch (44). The control circuit (42) and the switch (44) are associated with the processor (36) for receiving the enablement state decision therefrom. Further, as described in detail below, the switch (44) is actuatable between an open state and a closed state in order to implement the enablement state decision.

Figure 3:
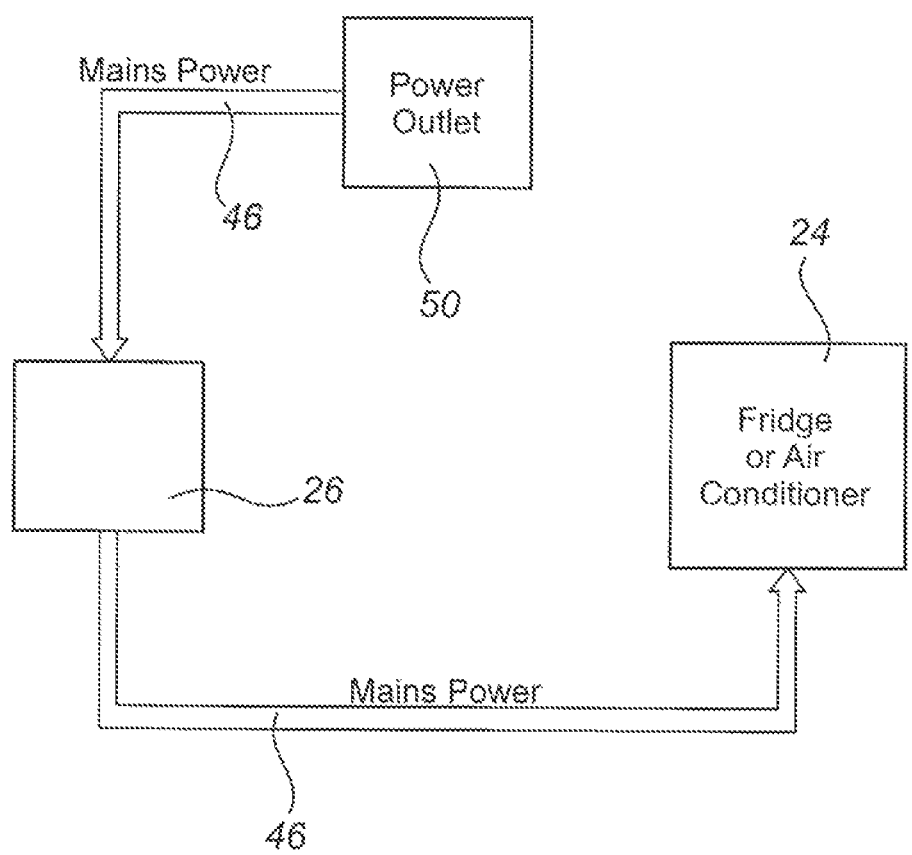
FIG. 3 is a schematic diagram of the apparatus and the load, as shown in FIG. 2, connected within an energization circuit.
Figure 4:
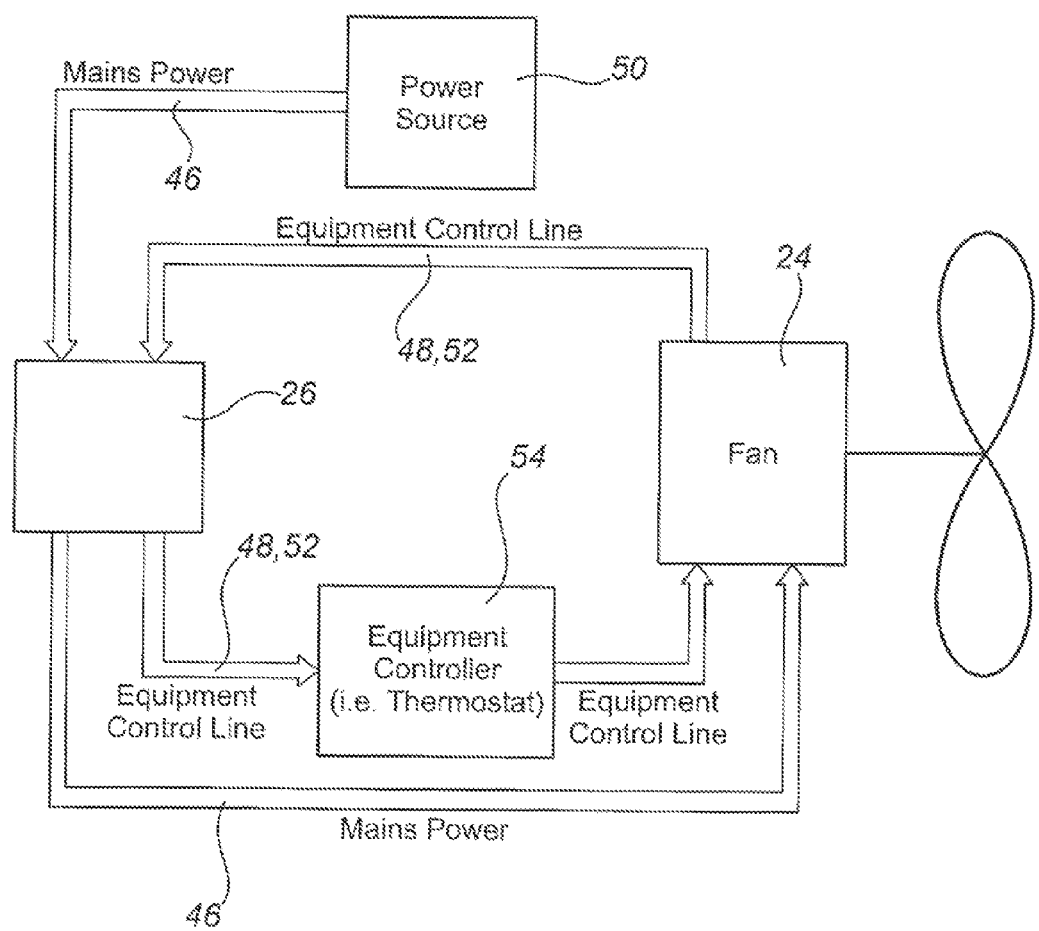
FIG. 4 is a schematic diagram of the apparatus and the load, as shown in FIG. 2, connected within a control line circuit.

Any type of control circuit (42) and compatible switch (44) may be used which are capable of implementing the enablement state decision. However, preferably, the control circuit (42) and the switch (44) are compatible for use with one or both of an energization circuit (46) for controlling an energization-controllable load, as shown in FIG. 3, and a control line circuit (48) for controlling a control line-controllable load, as shown in FIG. 4. In the preferred embodiment, the controller (40) is capable of use with both an energization circuit (46) and a control line circuit (48) such that the controller (40) is compatible for use in controlling either an energization-controllable load or a control line-controllable load.

In the preferred embodiment, the control circuit (42) is preferably comprised of a transistor array such as a Darlington transistor, often referred to as a Darlington pair. In the preferred embodiment the switch (44) is a relay switch comprised of a Double-Pole Double-Throw relay capable of handling 15 Amperes of load. One of the relay poles is provided for use with an energization-controllable load, while the other of the relay poles is provided for use with a control line-controllable load. Alternatively, the switch (44) may be comprised of a Single-Pole Single-Throw relay in which a single pole may be used for either an energization-controllable load or a control line-controllable load.

Referring to FIG. 3, the load (24) may be connected within an energization circuit (46). Preferably, the energization circuit (46) is comprised of an electrical energy source (50). In the preferred embodiment, the energization circuit (46) is a mains power circuit for controlling the power provided to the load (24). In this case, the load (24) is an electrical load, particularly an energization-controllable load. Examples of an energization-controllable load include refrigerators, freezers, plug-in portable air conditioners and other equipment and appliances typically "plugged-in" to a standard power outlet.

Referring further to FIGS. 2 and 3, the apparatus (26) is connected within the energization circuit (46) between the load (24) and the electrical energy source (50), such as a power supply or outlet. More particularly, the switch (44) is connected within the energization circuit (46) and is actuatable between an open state and a closed state in order to implement the enablement state decision. Specifically, the switch (44) is actuated to the closed state so that the energization circuit (46) is closed when the load (24) is desired to be in the load enabled state. Conversely, the switch (44) is actuated to the open state so that the energization circuit (46) is opened when the load (24) is desired to be in the load disabled state.

For example, where the load (24) is a household freezer, if the processor (36) determines that the freezer should be in the load disabled state, the controller (40) opens the switch (44) to open the power or energization circuit (46). As a result, the power supply to the freezer is interrupted or cut-off and the freezer will not be capable of turning on. Alternately, if the processor (36) determines that the freezer should be in the load enabled state, the controller (40) closes the switch (44) to close the power or energization circuit (46). As a result, the power supply to the freezer is connected providing power to the freezer. Thus, the freezer will be capable of turning on.

However, the control system of the freezer will actually determine whether to turn the freezer on or off. More specifically, the freezer may be configured through the control system of the freezer to operate according to a natural duty cycle. The natural duty cycle may represent a percentage of time that the freezer must actually operate in order to provide a particular result.

Referring to FIG. 4, the load (24) may be connected within a control line circuit (48). In the preferred embodiment, the control line circuit (48) is comprised of an electrical control line (52) associated with an equipment controller (54) for the load (24). In this case, the load (24) is a control line-controllable load. Examples of a control line-controllable load include chillers, furnaces, air circulation fans, space heaters, hot water heaters and air conditioners.

Referring further to FIGS. 2 and 4, the apparatus (26) is connected within the control line circuit (48) with the load (24) and the equipment controller (54). More particularly, the switch (44) is connected within the control line circuit (48), and particularly is connected within the electrical control line (52). As above, the switch (44) is actuatable between an open state and a closed state in order to implement the enablement state decision. Specifically, the switch (44) is actuated to the closed state so that the control line circuit (48) is closed when the load (24) is desired to be in the load enabled state. Conversely, the switch (44) is actuated to the open state so that the control line circuit (48) is opened when the load (24) is desired to be in the load disabled state.

Alternatively, the control line circuit (48) may be configured so that the switch (44) is actuated to the open state so that the control line circuit (48) is opened when the load (24) is desired to be in the load enabled state and so that the switch (44) is actuated to the closed state so that the control line circuit (48) is closed when the load (24) is desired to be in the load disabled state.

For example, where the load (24) is a circulation fan as shown in FIG. 4, if the processor (36) determines that the circulation fan should be in the load disabled state, the controller (40) opens the switch (44) to open the control line circuit (48), which mimics an off signal for the load (24). As a result, the circulation fan will be turned off. Alternately, if the processor (36) determines that the circulation fan should be in the load enabled state, the controller (40) closes the switch (44) to close the control line circuit (48). As a result, the control of the circulation fan is returned to the equipment controller (54), such as a thermostat, and the circulation fan will be capable of turning on. However, the equipment controller (54) will actually determine whether to turn the circulation fan on or off.

When the apparatus (26) is utilized within an energization circuit (46) or a control line circuit (48), the apparatus (26) is in a control mode. Specifically, the energization circuit (46) preferably provides a control mode referred to as a power mains control. The control line circuit (48) preferably provides a control mode referred to as a control line signal control. In addition, the apparatus (26) may be utilized in a monitoring mode. The monitoring mode is not a control mode. Rather, the apparatus (26) monitors the load (24) only and transmits load state data generated from the load (24) to the other apparatuses (26a . . . 26n). Typically, the monitoring mode is utilized for non-discretionary or "must-run" loads, such as lighting systems or $CO_2$ exhaust fans.

In addition, referring to FIG. 2, the apparatus (26) is preferably further comprised of a sensor device (56) for sensing the energy demand of the load (24). Thus, in the preferred embodiment in which the load (24) is an electrical load, the sensor device (56) is comprised of an electrical energy sensor device. In order to make an enablement state decision, the processor (36) of the apparatus (26) is preferably provided with information concerning the energy demand of the load (24). The sensor device (56) is utilized to provide this information.

In the preferred embodiment, the electrical energy sensor device (56) is comprised of at least one current sensor (58) and an associated rectifier or rectifier circuit (60). The current sensor (58) may be comprised of any device or mechanism capable of sensing or detecting a current. However, preferably, the current sensor (58) is comprised of a current transformer, such as a clamp-on current transformer, for sensing current within a wire and thereby producing a voltage proportional to the current. For instance, a current transformer may be clamped on to each individual "hot" or live conductor of a single phase, two-phase or three-phase alternating current load voltage supply, such as the energization circuit (46) or mains power from the electrical energy source (50), as shown in FIGS. 3 and 4. Thus, greater than one current sensor (58) may be utilized. The output of each current transformer, being an alternating current voltage, is then fed or conducted to an associated rectifier circuit (60).

A separate rectifier circuit (60) may be provided for each current transformer or a single rectifier circuit (60) may be provided for all of the current transformers. The rectifier circuit (60) may be comprised of any known or conventional rectifier capable of converting alternating current to direct current. In the preferred embodiment, a direct current voltage is produced which is proportional to the alternating current voltage from the current sensor (58).

Where more than one rectifier circuit (60) is used, the direct current voltage from each rectifier circuit (60) may be summed in order to determine the energy demand of the load (24). If a single rectifier circuit (60) is used, each of the phases may be measured in sequence and the direct current voltages may then be summed in order to determine the energy demand of the load (24). In the preferred embodiment, the direct current voltages are summed by the processor (36).

As a result, in the preferred embodiment the apparatus (26) further includes an analog to digital converter (62) for converting each of the analog direct current voltage readings obtained from a single rectifier circuit (60) into separate digital readings, which digital readings are then summed by the processor (36) to produce a single digital signal. The digital signal is produced by the analog to digital converter (62) to facilitate the use and processing of the information by the processor (36). In the preferred embodiment, the processor (36) is comprised of the analog to digital converter (62) such that the analog to digital converter (62) is contained therein or forms a component of the processor (36).

Preferably, electrical power is provided to the apparatus (26) such that the apparatus (26) is capable of performing its functions as described herein. Preferably, the electrical power is provided by one or more batteries. In the preferred embodiment, the apparatus (26) is comprised of a rechargeable battery (64) for providing electrical power to the apparatus (26). The rechargeable battery (64) may be re-charged using any known or conventional charging device or mechanism. However, preferably, the apparatus (26) is further comprised of a recharge circuit (66) for recharging the battery (64).

Any conventional or known recharge circuit (66) may be used. However, in the preferred embodiment, the recharge circuit (66) is comprised of the electrical energy sensor device (56). In particular, the sensor device (56) performs a dual role. First, as indicated above, the sensor device (56) senses or measures the energy demand of the load (24). Second, the sensor device (56) provides power to the recharge circuit (66) in order to recharge the rechargeable battery (64).

Further, in the preferred embodiment, the apparatus (26) is additionally comprised of a device (68) for adjusting a duty cycle of the load (24). The duty cycle of the load (24) is the percentage of time that the load (24) must operate in order to satisfy its assigned objectives. A natural duty cycle defines the percentage of time that the load (24) must operate within its environment to provide a particular result or to achieve a particular objective. However, if desired, the load may be assigned a duty cycle. An assigned duty cycle may be either more or less that the natural duty cycle of the load (24).

The adjusting device (68) may be used where desired to adjust the duty cycle of the load (24) for any reason, including providing an assigned duty cycle. Any device may be used which is capable of adjusting the duty cycle. Preferably, the adjusting device (68) is operatively associated or connected with the processor (36) and is manually adjustable to permit the operator of the apparatus (26) to adjust the duty cycle either upwards or downwards as necessary. For instance, the adjusting device (68) may be comprised of a keypad permitting the inputting of a desired duty cycle.

In the preferred embodiment, the duty cycle of the load (24) is an assigned duty cycle which represents the percentage of time that the load (24) is capable of operating even when the load is not actually operating. The assigned duty cycle is therefore based upon the enablement state of the load (24), wherein a load enabled state in the context of the assigned duty cycle is a state where the load (24) is capable of operating even when the load (24) is not actually operating, and a load disabled state is a state where the load (24) is not capable of operating. If the assigned duty cycle is 100 percent, the load (24) is always capable of operating, even if the load (24) is not actually operating. If the assigned duty cycle is 0 percent, the load (24) is never capable of operating.

In the preferred embodiment, the assigned duty cycle is therefore assigned to the load (24) via the apparatus (26) and/or the adjusting device (68), so that the assigned duty cycle is assigned to the load (24) indirectly.

In the preferred embodiment, the load (24) may also be configured to operate according to a natural duty cycle which represents a percentage of time that the load (24) must actually operate in order to provide a particular result.

In the preferred embodiment, the operation of the load (24) according to the natural duty cycle is subject to the assigned duty cycle, so that the operation of the load (24) according to the natural duty cycle for the load (24) is constrained by the assigned duty cycle.

Further, the apparatus (26) preferably includes a display (70) for providing a visual representation of the assigned duty cycle of the load (24). Thus, the display (70) is also operatively associated or connected with the processor (36) such that the present or current assigned duty cycle for the load (24) may be provided by the processor (36) to the display (70) and such that the adjusted or assigned duty cycle may be displayed as the assigned duty cycle is being adjusted through the adjusting device (68).

As discussed above, the processor (36) is preferably programmed to perform a set of instructions permitting the processor (36) to perform one or more of its functions as described herein. In the preferred embodiment, the set of instructions permit the processor (36) to perform the functions necessary to make the enablement state decision for the load (24), independently of the other loads (24a . . . 24n). In other words, in the preferred embodiment the enablement state decision for the load (24) is made taking into consideration the sets of load state data from the other loads (24a . . . 24n), but is made independently of the enablement state decisions made for the other loads (24a . . . 24n) by the other apparatuses (26a . . . 26n). Further, the processor (36) is also preferably programmed to direct the controller (40) to implement the enablement state decision for the load (24).

The processor (36) may be programmed in any conventional or known manner to perform its intended functions and to carry out the necessary instructions. In the preferred embodiment, a computer readable medium (38) provides computer readable instructions or an algorithm for directing the processor (36) to carry out the functions which are either necessary or desirable in order to make the enablement state decision. Further, in the preferred embodiment, the computer readable medium (38) provides computer readable instructions or an algorithm directing the controller (40) to implement the enablement state decision for the load (24). Specifically, the instructions direct the processor (36) to direct the controller (40) to implement the enablement state decision.

The computer readable instructions provided by the computer readable medium (38) may be used to direct any compatible apparatus and processor capable of carrying out the instructions. However, in the preferred embodiment, the computer readable medium (38) provides computer readable instructions for directing the preferred embodiment of the apparatus (26) as described herein, including the preferred embodiment of the processor (36) and the controller (40).

Further, the present invention is directed at a method for managing a group of energy consuming loads comprising a plurality of loads (24, 24a . . . 24n). A method is also provided for managing an energy consuming load (24) in a group of energy consuming loads comprising the load (24) and a plurality of other loads (24a . . . 24n). The methods may be performed or carried out utilizing any compatible apparatus suitable for, and capable of, carrying out the methods. However, in the preferred embodiment, the apparatus (26) as described herein is utilized to perform the methods. Further, the apparatus (26) is programmed in the preferred embodiment to carry out instructions for performing the methods. Finally, the computer readable medium (38) provides computer readable instructions for directing the apparatus (26), including the processor (36) and the controller (40), to perform the methods.

In the preferred embodiment, a method is provided for managing a group of energy consuming loads comprising a plurality of loads. The plurality of loads preferably includes the load (24) and at least one other load (24a . . . 24n). The method includes generating a set of load state data from each of the loads (24, 24a . . . 24n) in the group of loads. The method further includes making an enablement state decision for each of the loads (24, 24a . . . 24n) using the sets of load state data from the loads (24, 24a . . . 24n). Each of the enablement state decisions reflects an enablement state of a corresponding load in the group of loads. Further, as discussed above, the enablement state is either a load enabled state or a load disabled state. In the preferred embodiment, each of the enablement state decisions is made independently of the enablement state decisions for the loads other than the corresponding load. Finally, the method includes implementing the enablement state decisions.

Further, a method is provided for managing an energy consuming load (24) in a group of energy consuming loads comprising the load (24) and a plurality of other loads (24a . . . 24n). The method includes generating a set of load state data from the load (24) and compiling the set of load state data generated from the load (24) with sets of load state data generated from the other loads (24a . . . 24n). Further, the method includes making an enablement state decision for the load (24) using the compiled sets of load state data. As above, the enablement state decision reflects an enablement state of the load (24), wherein the enablement state is either a load enabled state or a load disabled state. Further, in the preferred embodiment the enablement state decision is made independently of the other loads (24a . . . 24n). Finally, the method includes implementing the enablement state decision for the load (24).

Thus, in the preferred embodiment, the computer readable medium (38) provides instructions to the apparatus (26) for, and the processor (36) is programmed for, generating the set of load state from the load (24) and compiling the set of load state data from the load (24) with the sets of load state data from the other loads (24a . . . 24n). Thus, each apparatus (26) compiles or gathers all available sets of load state data. In other words, in the preferred embodiment, a set of load state data is generated for each of the loads (24, 24a . . . 24n) in the group of loads to be managed and is compiled or gathered by each of the apparatuses (26, 26a . . . 26n) associated with each of the loads (24, 24a . . . 24n) in the group of loads.

Specifically, as discussed above, the transceiver (32) transmits and receives the various sets of load state data such that the sets of load state data may be compiled by the processor (36). The computer readable medium (38) further provides instructions to the processor (36), or the processor (36) is programmed, for processing the compiled sets of load state data in order to make the enablement state decision for the load (24). Enablement state decisions are also made for each of the other loads (24a . . . 24n) in the group of loads being managed. In the preferred embodiment the enablement state decision made for the load (24) is made independently of the enablement state decisions made for each of the other loads (24a . . . 24n).

Finally, the computer readable medium (38) provides instructions to the processor (36), or the processor (36) is programmed, for directing the controller (40) to implement the enablement state decision for the load (24). Thus, when managing a group of loads, the enablement state decision is implemented for each of the load (24) and the other loads (24a . . . 24n) in the group of loads.

In all aspects of the invention, the load (24) or at least one of the loads (24, 24a . . . 24n) in the group of loads is a discretionary load. Each of the loads in a group of loads may be either a non-discretionary load or a discretionary load. A non-discretionary load is a load which must always be in an enabled state, which must be enabled rigidly according to a schedule, which must be enabled rigidly according to a set of constraints, or which must always be available to be enabled when called upon. A load in the monitoring mode, as discussed above, is also considered to be a non-discretionary load. A discretionary load is a load for which there is some flexibility in operating within a schedule or within a set of constraints, as long as the load is capable of achieving its duty cycle.

Further, as discussed above, the load (24) and each of the other loads (24a . . . 24n) has a duty cycle. In the preferred embodiment, the duty cycle for at least one of the discretionary loads is less than 100 percent. Thus, the duty cycle may be less than 100 percent for the load (24) and/or at least one of the other loads (24a . . . 24n). The duty cycle is the percentage of time that the load must operate in order to satisfy its assigned objectives. Thus, the load must operate less than 100 percent of the time to satisfy its assigned objectives.

The enablement state decision for each load (24) and each other load (24a . . . 24n) is made with a goal of achieving a target system equilibrium for the group of loads. The target system equilibrium preferably represents an energy demand for the group of loads (24, 24a . . . 24n) which approaches an average energy demand for the group of loads (24, 24a . . . 24n). More preferably, the target system equilibrium is equal to a sum for all of the loads (24, 24a . . . 24n) in the group of loads of a product of the energy demand of one of the loads and the duty cycle of the one of the loads. Thus, for instance, the contribution of the load (24) to the target system equilibrium is the product of the energy demand of the load (24) and the duty cycle of the load (24).

However, each of the load (24) and the other loads (24a . . . 24n) in the group of loads has an enablement need in order to achieve its duty cycle. Although the enablement state decisions are made with a goal of achieving the target system equilibrium, the enablement state decision for each load (24, 24a . . . 24n) is constrained by the enablement need of that load.

The enablement need of each load (24, 24a . . . 24n) relates to the "urgency" of the need for that load to be placed in the load enabled state. Although the enablement need or urgency may be based upon a number of factors, typically the enablement need is based upon an amount of time in which that load has been in the load enabled state, upon an amount of time remaining for that load to achieve its duty cycle, and upon the duty cycle of that load. Thus, for example, the enablement need will be more urgent where a load is at risk of not achieving its duty cycle.

Further, the enablement need will also be dependent upon whether the load is a discretionary or a non-discretionary load. A non-discretionary load has a rigid enablement need. Thus, for non-discretionary loads, or in order to cause a discretionary load to behave as a non-discretionary load, a load may be assigned a duty cycle of 100 percent. Alternatively, for non-discretionary loads, or in order to cause a discretionary load to behave as a non-discretionary load, the amount of time which is required in order for the load to achieve its duty cycle may be indicated to be an amount which is greater than or equal to the time remaining for the load to achieve its duty cycle.

Additionally, in the preferred embodiments, the enablement state decision for each load (24, 24a ... 24n) is constrained by the energy demands of the loads. Thus, for example, the enablement state decision for a load which will not cause the target system equilibrium for the group of loads to be exceeded if the load is placed in the load enabled state may be more likely to indicate the load enabled state than the enablement state decision for a load which will cause the target system equilibrium to be exceeded if the load is placed in the load enabled state.

In any event, as indicated above, the enablement state decision for each load (24) and each other loads (24a ... 24n) in a group of loads is made using the compiled sets of load state data. Each set of load state data includes information or data concerning or relating to a corresponding load. The information may be comprised of identifying information, operational information or any other information which may assist in making the enablement state decision for any of the loads.

In preferred embodiments, each set of load state data is comprised of an enablement need indication indicating the enablement need of the corresponding load, which relates to the extent to which the duty cycle of the corresponding load has been satisfied. Further, each set of load state data is comprised of an energy demand indication indicating the energy demand of the corresponding load, a duty cycle indication indicating the duty cycle of the corresponding load, a load identifying indication for identifying the corresponding load and a time indication for identifying the time to which the load state data for the corresponding load relates.

The duty cycle indication may be used to determine the extent to which the corresponding load contributes to the target system equilibrium for the group of loads. Thus, the duty cycle indication may be expressed directly as the duty cycle of the corresponding load. From this information, the contribution of that load to the target system equilibrium may be calculated utilizing the duty cycle indication and the energy demand indication of the load. However, the duty cycle indication may alternately be indirectly expressed as the contribution of the load to the target system equilibrium. In addition, as discussed previously, each of the loads (24, 24a ... 24n) in the group of loads may be assigned a duty cycle utilizing the duty cycle adjusting device (68).

In the preferred embodiment, the enablement state decision for each of the loads (24, 24a ... 24n) is made independently of each of the other loads in the group. However, although the decisions are made independently, the enablement state decisions for the group of loads are preferably made in a decision making sequence. The decision making sequence provides the order in which the enablement state decision is made for each of the loads (24, 24a ... 24n). In the preferred embodiment, the decision making sequence is dependent upon the sets of load state data, and in particular, upon one or more of the indications outlined above.

For instance, the decision making sequence may be dependent upon the enablement need of each of the loads (24, 24a ... 24n) as provided in the enablement need indication for each corresponding load. In this instance, the enablement state decision for a load having a relatively higher enablement need is made before the enablement state decision for a load having a relatively lower enablement need.

Alternately or additionally, the decision making sequence may be dependent upon the energy demand of each of the loads (24, 24a ... 24n) as provided in the energy demand indication for each corresponding load. In this instance, the energy demand indication preferably indicates the maximum rate at which the corresponding load will consume energy when it is operating. In this instance, the enablement state decision for a load having a relatively higher energy demand is made before the enablement state decision for a load having a relatively lower energy demand.

Further, in the preferred embodiments, the steps of the methods are performed, and the sets of instructions are carried out, repeatedly in accordance with a schedule. The schedule is comprised of at least one period, and preferably a plurality of periods. Each period may be any length of time, however, preferably the length of each period is substantially the same or equal. Further, each period is preferably comprised of a plurality of segments. Each period may be divided into any number of segments, each segment being of any length of time. However, in the preferred embodiment, each period is divided into a number of equal time segments.

Further, the steps of the method are performed, and the instructions are carried out, one time during each segment of each period. Thus, the length of time of the period and the number of segments within the period are selected depending, at least in part, upon the speed at which the steps in the methods can be performed or the instructions carried out. Further, the length of time of the period and the number of segments within the period are also selected depending upon the desired degree of control over the loads which is desired to be achieved. As stated, the steps of the method are performed, and the instructions are carried out, one time during each segment of each period. Thus, greater control tends to be provided as the number of segments increases for each period or as the length of time of each segment decreases.

In the preferred embodiments, each period is between about two hours and three hours and the number of segments in each period is twelve. As a result, the length of each segment is between about ten minutes and about fifteen minutes.

Further, in preferred embodiments, the duty cycle of each load is defined having regard to the periods. Thus, the enablement need of each of the loads (24, 24a ... 24n) is preferably defined by a remaining number of segments in the period during which the load must be in the load enabled state in order to achieve its duty cycle Referring to FIGS. 5-8b, in the preferred embodiment, four processes or sets of instructions are conducted concurrently or as required to perform the methods of the invention, resulting in the making and implementing of the enablement state decision for the load (24). The goal of the processes or sets of instructions is to manage the energy demand of the energy consuming load (24) and to manage the collective energy demand of a group of energy consuming loads, including the load (24) and the plurality of other loads (24a ... 24n). More particularly, in the preferred embodiment, the goal is to manage or control the peak energy demand in each instance by achieving the target system equilibrium for the group of loads. In the preferred embodiment, this goal is accomplished by making an enablement state decision with respect to each load (24) and each other load (24a ... 24n) which takes into account the load state data of all loads but is made independently of the other loads.

Figure 5:
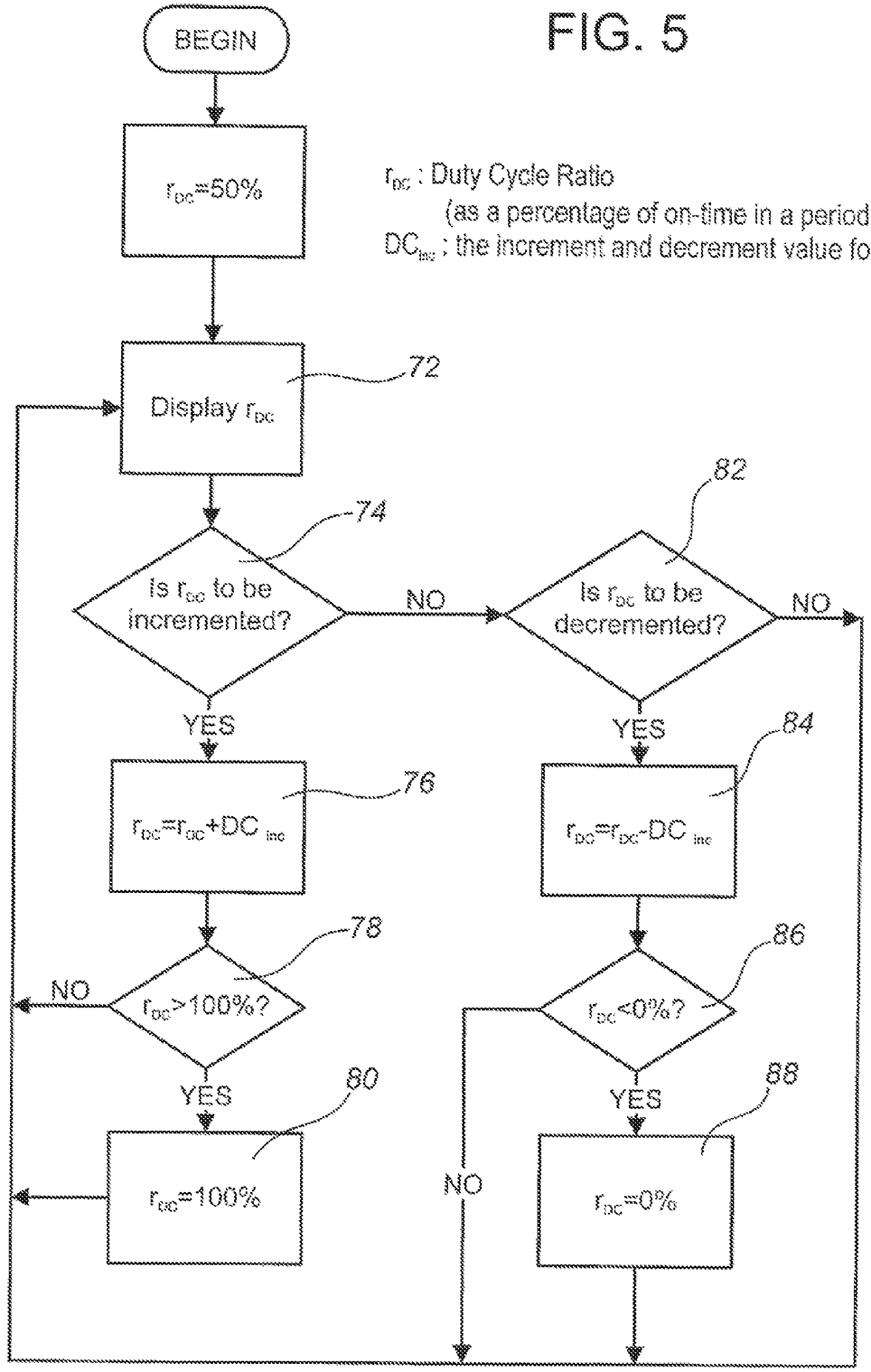
FIG. 5 is a flow chart depicting a preferred method for adjusting and displaying a duty cycle as part of an overall method for managing one or a group of energy consuming loads.

In the preferred embodiment, the four processes or sets of instructions are set out in the flow charts shown in FIGS. 5-8b. First, referring to FIG. 5, a set of instructions or an algorithm is provided for adjusting and displaying the duty cycle of the load (24). It is understood that the same processes or sets of instructions would be carried out for each of the other loads (24a ... 24n) as well. In FIG. 5:

| | |
|---|---|
| $r_{DC}$ | refers to the duty cycle ratio (as a percentage of required on-time in a period or required time in an enabled state); |
| $DC_{INC}$ | refers to the increment and decrement value for $r_{DC}$. |

Referring to the flow chart of FIG. 5, the current duty cycle ratio "$r_{DC}$" for the load (24), expressed as a percentage of required "on-time" or percentage of time that the load (24) is required to operate in a period, is displayed (72). For exemplary purposes only, the flow chart indicates a duty cycle of 50%. In the preferred embodiment, the current duty cycle ratio "$r_{DC}$" is displayed on the display (70).

If the duty cycle ratio "$r_{DC}$" is desired to be incremented (74), the duty cycle ratio is adjusted upwardly utilizing the duty cycle adjusting device (68). The adjusted duty cycle ratio "$r_{DC}$" is determined (76) as the sum of the current duty cycle ratio "$r_{DC}$" and the desired increment value for the duty cycle ratio "$DC_{INC}$". A determination (78) is then made as to whether the adjusted duty cycle ratio is greater than 100%. If the adjusted duty cycle ratio is not greater than 100%, the adjusted duty cycle ratio "$r_{DC}$" is displayed (72) as the new current duty cycle ratio. If the adjusted duty cycle ratio is greater than 100%, then the adjusted duty cycle ratio is set at 100% (80) and is displayed (72) as the new current duty cycle ratio.

If the duty cycle ratio "$r_{DC}$" is desired to be decremented (82), the duty cycle ratio is adjusted downwardly utilizing the duty cycle adjusting device (68). The adjusted duty cycle ratio "$r_{DC}$" is determined (84) by deducting or subtracting the desired decrement value for the duty Cycle ratio "$DC_{INC}$" from the current duty cycle ratio "$r_{DC}$". A determination (86) is then made as to whether the adjusted duty cycle ratio is less than 0%. If the adjusted duty cycle ratio is not less than 0%, the adjusted duty cycle ratio "$r_{DC}$" is displayed (72) as the new current duty cycle ratio. If the adjusted duty cycle ratio is less than 0%, then the adjusted duty cycle ratio is set at 0% (88) and is displayed (72) as the new current duty cycle ratio.

Figure 6:
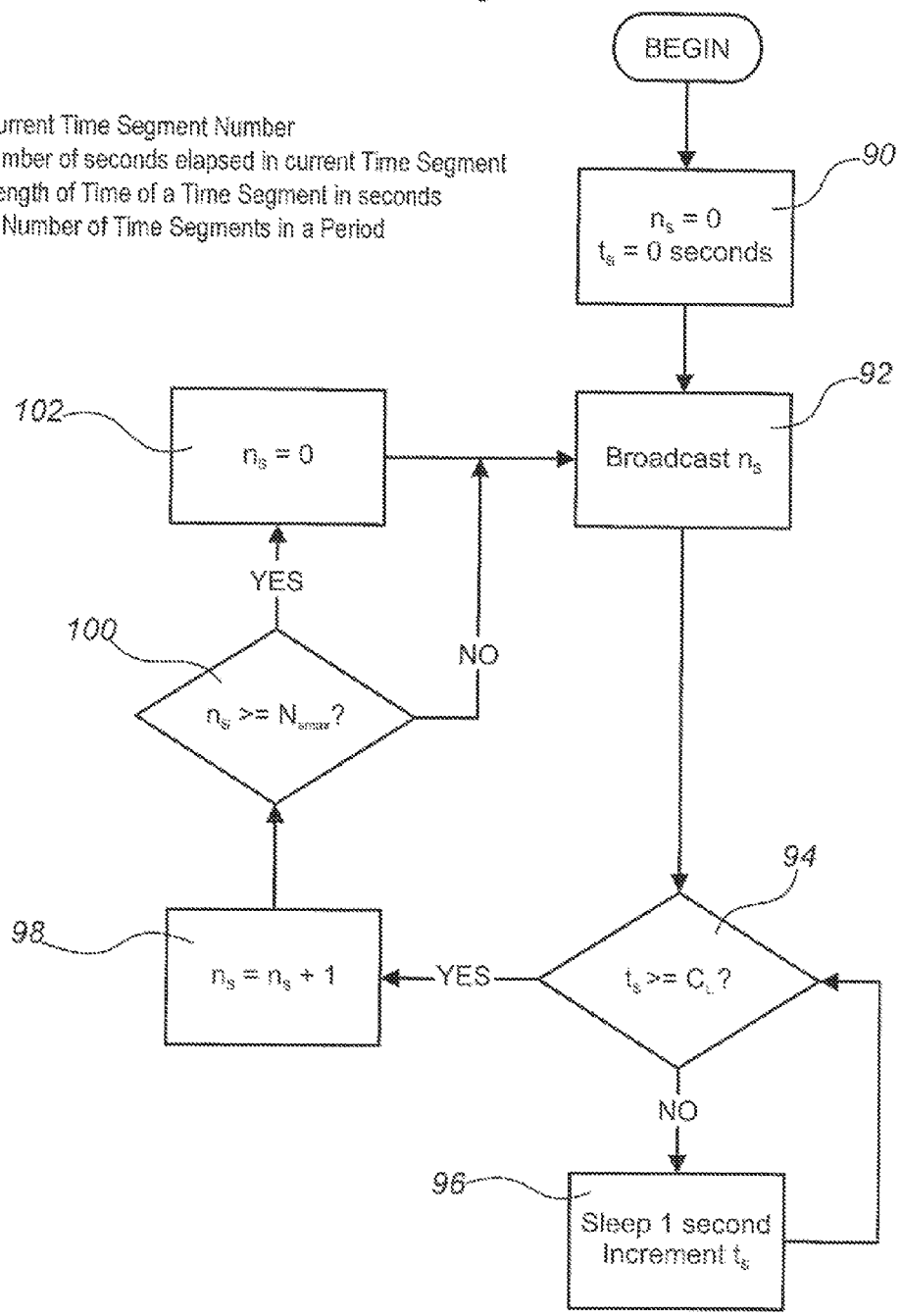
FIG. 6 is a flow chart depicting a preferred method for performing a time synchronization function as part of an overall method for managing one or a group of energy consuming loads.

Second, referring to FIG. 6, a set of instructions or an algorithm is provided for performing a time-keeping or time synchronization function. In the preferred embodiment within a network comprising the use of a plurality of apparatuses (26, 26a . . . 26n) for use with a group of loads (24, 24a . . . 24n), a single apparatus (26) is selected to perform the time-keeping function. Specifically, the selected apparatus (26), and particularly the processor (36) of the selected apparatus (26), will cause a timing pulse to be generated and transmitted to the other apparatuses (26a . . . 26n) such that the functions or activities of the network of apparatuses (26, 26a . . . 26n) may be coordinated to perform the overall methods of the present invention. A timing pulse may be transmitted at any desired time intervals. However, preferably, a timing pulse is transmitted at the start of each new segment within the period. Thus, in the preferred embodiment, a timing pulse is transmitted about every 10 to 15 minutes. In FIG. 6:

| | |
|---|---|
| $n_s$ | refers to the current time segment number within the period; |
| $t_s$ | refers to the time elapsed in the current time segment; |
| $C_L$ | refers to the length of time of a time segment; |
| $N_{smax}$ | refers to the total number of time segments in the period. |

Any unit of time may be used in the invention. In the preferred embodiment the unit of time is seconds so that $t_s$ and $C_L$ are both expressed in seconds.

To commence the time synchronization operation (90), the current time segment number "$n_s$" and the number of seconds elapsed in the current time segment "$t_s$" are determined. For exemplary purposes, at the commencement of the operation (90), the current time segment number is indicated as zero (0). Further, in the preferred embodiment, the timing pulse is transmitted at the start of every segment. Thus, in this example, the number of seconds elapsed in the current time segment is indicated as zero (0). Accordingly, the current time segment number is broadcast or transmitted (92) when zero seconds have elapsed in the current time segment.

A determination (94) is then made regarding whether or not the number of seconds elapsed in the current time segment "$t_s$" is greater than or equal to the length of time of the time segment "$C_L$". If the number of seconds elapsed in the current time segment "$t_s$" is less than the length of time of the time segment "$C_L$", the number of seconds elapsed in the current time segment is incremented by one second (96) and the determination step (94) is repeated. In other words, the determination step (94) is repeated every second until the number of seconds elapsed in the current time segment "$t_s$" is greater than or equal to the length of time of the time segment "$C_L$".

When the determination (94) is made that the number of seconds elapsed in the current time segment "$t_s$" is greater than or equal to the length of time of the time segment "$C_L$", the current time segment is adjusted (98) or a new current time segment is determined. The adjusted or new current time segment "$n_s$" is determined by increasing the current time segment by one ($n_s$+1).

The question (100) is then posed as to whether the adjusted or new current time segment "$n_s$" is greater than or equal to the total number of time segments in the period "$N_{smax}$". If the adjusted or new current time segment "$n_s$" is less than the total number of time segments in the period "$N_{smax}$", then the adjusted or new current time segment number is broadcast (92). Thus, for exemplary purposes, the adjusted or new current time segment number, being one "1", will be broadcast or transmitted (92) when zero seconds have elapsed in the adjusted or new current time segment.

If the adjusted or new current time segment "$n_s$" is greater than or equal to the total number of time segments in the period "$N_{smax}$", then the current time segment number is reset (102) to zero (0) and subsequently broadcast (92). Specifically, for exemplary purposes, the reset current time segment number, being zero, will be broadcast or transmitted (92) when zero seconds have elapsed in the reset current time segment.

Figure 7:
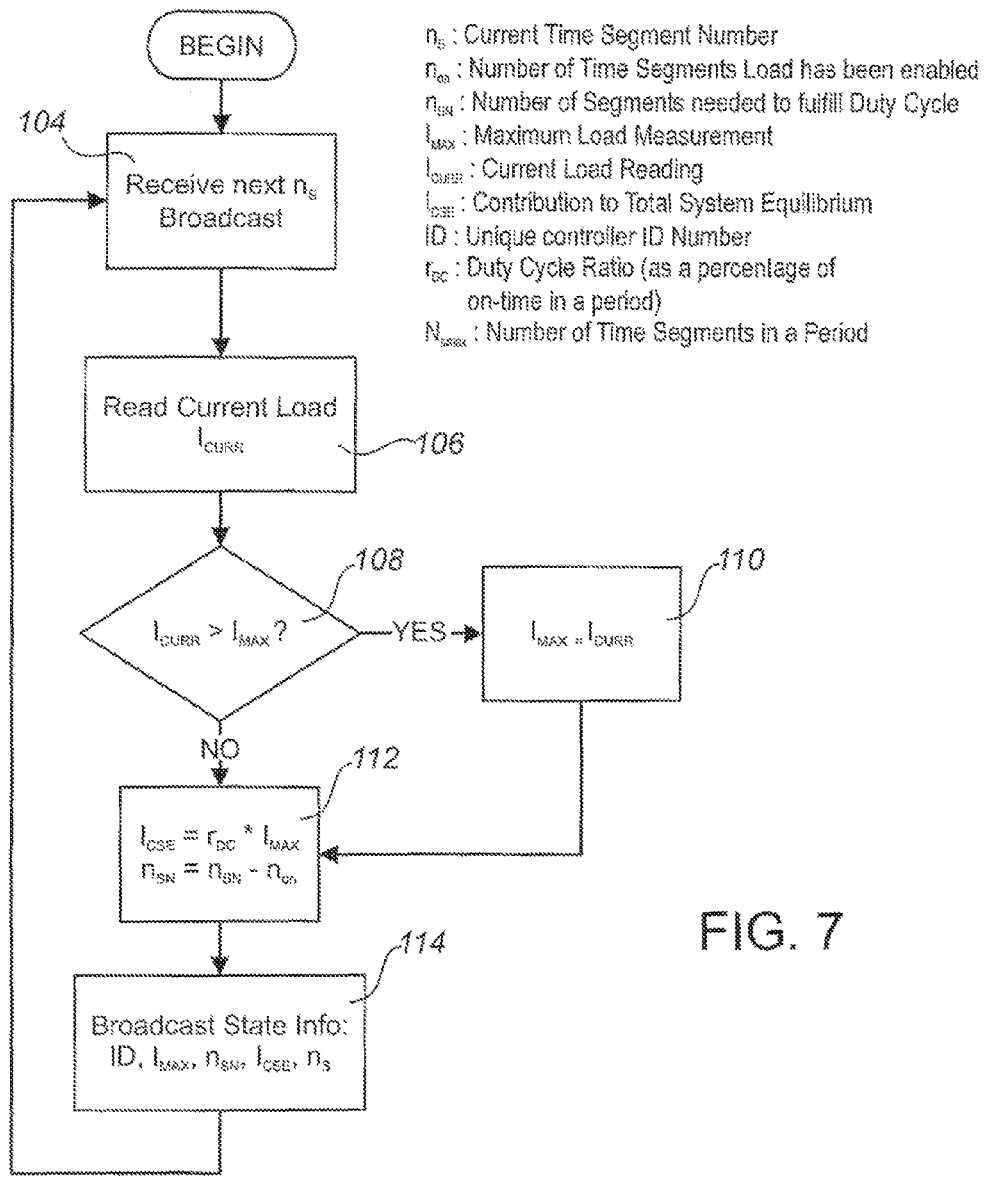
FIG. 7 is a flow chart depicting a preferred method for generating load state data for a load and transmitting the load state data as part of an overall method for managing one or a group of energy consuming loads.
Figure 8:
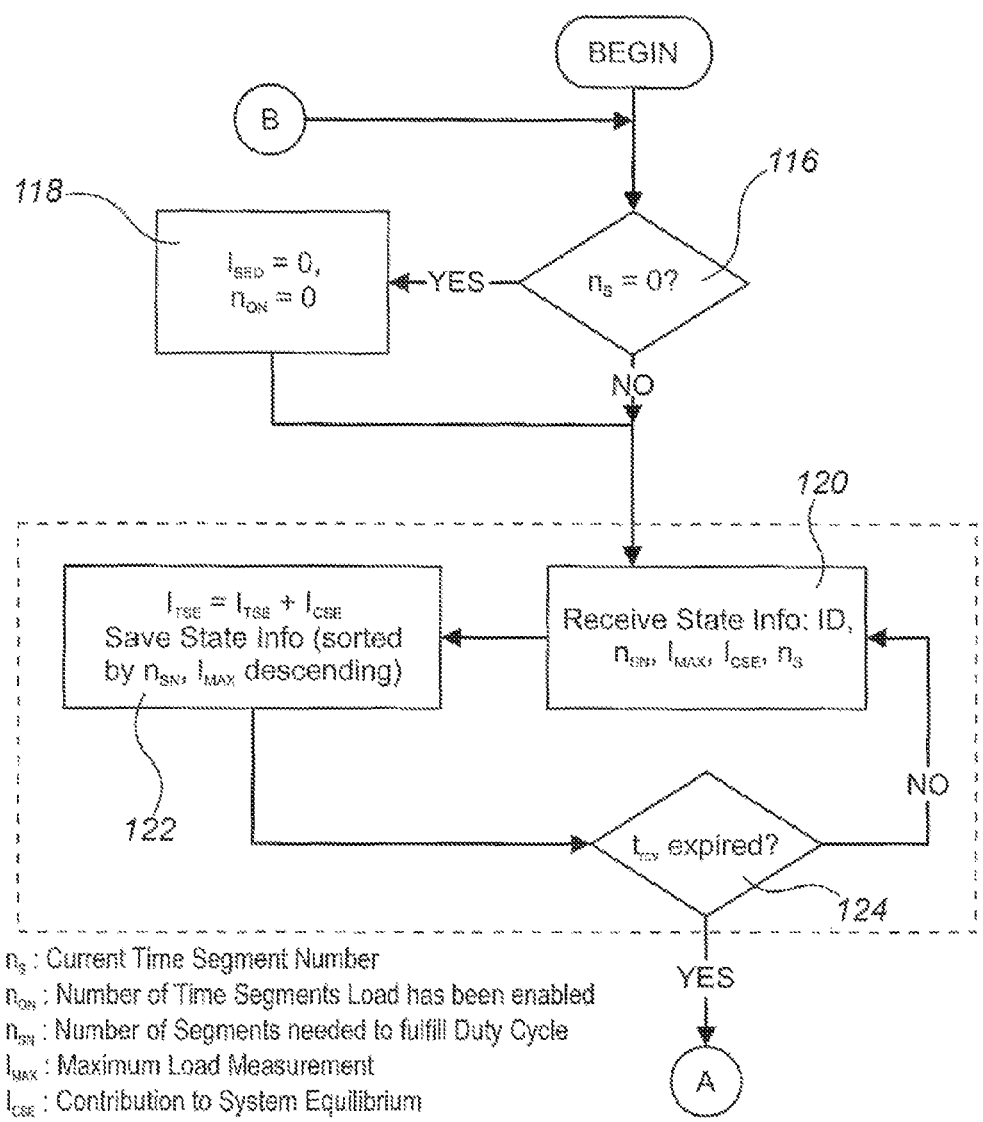
FIGS. 8a and 8b are a flow chart depicting a preferred method for making an enablement state decision for a load as part of an overall method for managing one or a group of energy consuming loads.

Third, referring to FIG. 7, a set of instructions or an algorithm is provided for generating a set of load state data for the load (24) and transmitting the load state data. In the preferred embodiment, the processor (36) of each apparatus (26, 26a . . . 26n) in the network generates a set of load state data for the corresponding load (24, 24a . . . 24n) at the commencement of each segment. This load state data is then transmitted to each of the other apparatuses (26, 26a . . . 26n) by their respective transmitters (28). Thus, in the preferred embodiment, the set of load state data for the corresponding load is generated and transmitted about every 10 to 15 minutes. In FIG. 7:

| | |
|---|---|
| $n_s$ | refers to the current time segment number within the period and provides the "time indication" of the time to which the set of load state data relates; |
| $n_{on}$ | refers to the number of time segments within the period that the load has been in the load enabled state; |

-continued

| | |
|---|---|
| $n_{SN}$ | refers to the number of segments within the period needed to fulfill the duty cycle of the load and provides the "enablement need indication" of the enablement need of the load; |
| $I_{MAX}$ | refers to the maximum load measurement and provides the "energy demand indication" of the energy demand of the load; |
| $I_{CURR}$ | refers to the current load reading or current load measurement; |
| $I_{CSE}$ | refers to the contribution of the load to the target system equilibrium; |
| ID | refers to the unique identification number for the apparatus (26, 26a ... 26n) and provides the "load identifying indication" identifying the load to which the set of load state data relates; |
| $r_{DC}$ | refers to the duty cycle ratio (as a percentage of required on-time or time in an enabled state for the load in a period) and provides the "duty cycle indication" of the duty cycle of the load; |
| $N_{smax}$ | refers to the total number of time segments in the period. |

To commence the operation (104), the current time segment number broadcast (92) as the timing pulse in the operation of FIG. 6 is received, preferably by the receiver (30) of each apparatus (26, 26a ... 26n) in the network. Upon receipt of the timing pulse, a measurement or reading of the current load "$I_{CURR}$" is generated (106). If the current load includes more than one phase, then $I_{CURR}$ represents the sum of the measurements for the phases. In the preferred embodiment, the sensor device (56) is utilized to provide the necessary reading or measurement. If the apparatus (26) is the apparatus (26) which is performing the time-keeping function, then the apparatus (26) implicitly receives the timing pulse and generates the measurement of $I_{CURR}$.

A determination (108) is then made as to whether the current load "$I_{CURR}$" is greater than the maximum load "$I_{MAX}$" previously measured by the sensor device (56) or previously provided to the processor (36). The maximum load measurement is utilized to provide the energy demand indication with respect to the corresponding load. If the current load measurement is greater than the maximum load measurement, the maximum load measurement, and thus the energy demand indication, is updated or reset to correspond with or be equal to the current load measurement (110). The reset or updated maximum load measurement "$I_{MAX}$" is subsequently further processed in the next step (112) of the operation. If the current load measurement is not greater than the maximum load measurement, the maximum load measurement "$I_{MAX}$" is not reset or updated prior to further processing in the next step (112) of the operation.

The next step (112) of the operation is comprised of a calculation or generation of the contribution of the load to the target system equilibrium "$I_{CSE}$". In particular, the contribution of the load to the target system equilibrium "$I_{CSE}$" is the product of the duty cycle of the load or the duty cycle indication ("$r_{DC}$") and the maximum load measurement or energy demand indication for the load ("$I_{MAX}$"). The sum of the contributions for all of the loads in the group of loads provides the target system equilibrium. The next step (112) of the operation is further comprised of a calculation or generation of the current number of segments within the period for which the load must be in an enabled state in order to fulfill its duty cycle "$n_{SN}$", being the enablement need indication.

In particular, the current enablement need indication "$n_{SN}$" is calculated by subtracting the number of time segments that the load (24) has been enabled or is in the enabled state "$n_{on}$" during the period from the total number of time segments within the period which are needed to fulfill the duty cycle of the load "$n_{SN}$". In other words, $n_{SN}$(current)=$n_{SN}$(total)–$n_{on}$. The calculation of $n_{SN}$ (current) is performed for each segment using the value of $n_{SN}$ (total) which is applicable to the current duty cycle of the load. As a result, in circumstances where the duty cycle of the load is adjusted between segments, the value of $n_{SN}$ (total) which is used to calculate $n_{SN}$ (current) will change to reflect the adjustment of the duty cycle of the load.

Finally, the load state data concerning the load (24) generated by the processor (36) is broadcast (114) or transmitted. Specifically, the load state data concerning the load (24) is transmitted by the transmitter (28) of the apparatus (26) for receipt by the receiver (30) of each of the other apparatuses (26a ... 26n). In the preferred embodiment, the load state data which is broadcast (114) includes the load identifying indication "ID", the energy demand indication "$I_{MAX}$" the current enablement need indication "$n_{SN}$", the contribution to the target system equilibrium "$I_{CSE}$" and the time indication "$n_s$". As discussed previously, the contribution to the target system equilibrium "$I_{CSE}$" is calculated from, and thus includes information concerning, the duty cycle indication "$r_{DC}$".

Fourth, referring to FIGS. 8a and 8b, a set of instructions or an algorithm is provided for further processing the sets of load state data concerning the load (24) and the other loads (24a ... 24n) and making an enablement state decision for the load (24).

In the preferred embodiment, each segment of the period is further divided into four sub-segments. During the first sub-segment, the synchronization information or timing pulse is received by the apparatus (26). The first sub-segment occurs over a relatively short period of time. During the second sub-segment, the apparatus (26) transmits the load state data for the load (24) and receives the load state data for each of the other loads (24a ... 24n). The second sub-segment also occurs over a relatively short period of time. The portion of the second sub-segment in which the apparatus (26) receives the load state data concerning the other loads (24a ... 24n) is shown in the flow chart of FIG. 8a. During the third sub-segment, the processor (36) makes the enablement state decision for the load (24). The third sub-segment is shown in the flow chart of FIG. 8b and occurs over a relatively short period of time. Finally, the fourth sub-segment is a "do-nothing" segment. If the load (24) is actuated to an enabled state by the controller (40), the load (24) will function as if the apparatus (26) were not present. If the load (24) is actuated to a disabled state by the controller (40), the load (24) will either be turned off or remain off. In FIGS. 8a and 8b:

| | |
|---|---|
| $n_s$ | refers to the current time segment number within the period (the "time indication"); |
| $n_{ON}$ | refers to the number of time segments within the period that the load has been in the load enabled state; |
| $n_{SN}$ | refers to the number of segments within the period needed to fulfill the duty cycle of the load (the "enablement need indication"); |
| $n_L$ | refers to the current $n_{SN}$ level of the previously processed load; |
| $I_{MAX}$ | refers to the maximum load measurement (the "energy demand indication"); |
| $I_{CSE}$ | refers to the contribution of the load to the target system equilibrium; |
| $I_{TSE}$ | refers to the target system equilibrium; |
| $I_{GT}$ | refers to the gap to the target system equilibrium; |
| $I_{CUMSL}$ | refers to the computed cumulative system load, being the sum of $I_{MAX}$ for all loads (24, 24a ... 24n) in the group of loads being managed which are assumed to be enabled; |
| ID | refers to the unique identification number for the apparatus (the "load identifying indication"); |
| $t_{rcv}$ | refers to the window or sub-segment for receiving the load state data from the other loads (24a ... 24n); |
| $N_{smax}$ | refers to the total number of time segments in the period; |
| $S_{CTRL}$ | refers to the computed enablement state decision, being either an enabled state or a disabled state; |
| $I_{SED}$ | refers to the target system equilibrium deficit over the period. |

Referring to the flow chart of FIG. 8a, a set of instructions or an algorithm is provided for receiving the load state data concerning the other loads (24a . . . 24n). The operation commences with a query (116) as to whether the current time segment number "$n_s$" is zero (0). If the current time segment number is zero, the target system equilibrium deficit "$I_{SED}$" and the number of time segments that the load (24) has been enabled "$n_{ON}$" are reset (118) to zero (0). If the current time segment number is not zero, or once the reset operation (118) has been performed, the remaining steps in the process are conducted. Specifically, the remaining steps, as set out below, are repeated for each set of load state data received from each other apparatus (26a . . . 26n) for its corresponding other load (24a . . . 24n).

First, the set of load state data for the other load (24a . . . 24n) is received (120) by the apparatus (26). In the preferred embodiment, as described above, the set of load state data includes the load identifying indication "ID", the energy demand indication "$I_{MAX}$", the current enablement need indication "$n_{SN}$", the contribution to the target system equilibrium "$I_{CSE}$" and the time indication "$n_s$". Second, the load state data is initially processed (122). In particular, the target system equilibrium "$I_{TSE}$" is updated to reflect the current load state data being received. Further, the load state data for the other load is saved. Finally, all of the sets of load state data received by the apparatus (26) are sorted in descending order according to the $n_{SN}$ (current enablement need indication) and the $I_{MAX}$ (energy demand indication). Specifically, the sets of load state data are first or primarily sorted according to the enablement need indication, in descending order or from the greatest enablement need to the least enablement need. Where one or more loads has the same enablement need indication, those sets of load state data are secondarily sorted according to the energy demand indication, in descending order or from the greatest energy demand to the least energy demand.

A determination (124) is then made regarding whether the window or sub-segment for receiving the load state data has expired. If the window has not expired, further load state data is received (120) and initially processed (122). If the window has expired, the further steps set out in the flow chart of FIG. 8b are performed. Specifically, the flow chart of FIG. 8a and the flow chart of FIG. 8b are connected or related to each other at point designations "A" and "B".

Referring to the flow chart of FIG. 8b, a set of instructions or an algorithm is provided for making the enablement state decision for each load (24, 24a . . . 24n). Specifically, the steps of FIG. 8b for making the enablement state decisions are performed by each apparatus (26, 26a . . . 26n) in the network in order to calculate or determine an enablement state decision for each load (24, 24a . . . 24n) within the group of loads. However, although enablement state decisions are calculated for each load (24, 24a . . . 24n), the processor (36) of each apparatus (26, 26a . . . 26n) only implements the enablement state decision for its corresponding load.

The enablement state decisions for the loads (24, 24a . . . 24n) are made according to the decision making sequence, which is preferably provided by or determined by the enablement need and the energy demand of the loads. In the preferred embodiment, the decision making sequence is comprised of the descending order of the sets of load state data as determined in the initial processing step (122) of FIG. 8a. In other words, the enablement state decision will be made for each load (24, 24a . . . 24n) in sequence starting from the load having the greatest enablement need and energy demand and ending with the load having the least or lowest enablement need and energy demand. Once the apparatus makes or determines the enablement state decision for its respective or corresponding load, no subsequent enablement state decisions need be determined by that apparatus. Rather, the processor (36) of the apparatus will direct the controller (40) to implement the enablement state decision for its respective or corresponding load.

Referring to FIG. 8b, for exemplary purposes, at the commencement of the process prior to processing the load state data to make the enablement state decision for the first load in the decision making sequence, the computed cumulative system load "$I_{CUMSL}$" is zero (126). The gap to the target system equilibrium "$I_{GT}$" is then determined (128). Specifically, the $I_{GT}$ is equal to the target system equilibrium "$I_{TSE}$" less the computed cumulative system load "$I_{CUMSL}$", plus the system equilibrium deficit "$I_{SED}$" if the $I_{SED}$ is greater than zero. A series of queries are then made.

The first query (130) is whether the number of segments needed to fulfill the duty cycle of the corresponding load "$n_{SN}$" is zero (0). If the $n_{SN}$ is zero, the computed enablement state decision "$S_{CTRL}$" is determined or assumed to be the disabled state (132). In other words, if there is no need for this load to operate, it is assumed to be disabled.

If the $n_{SN}$ is not zero, the second query (134) is made as to whether the computed cumulative system load "$I_{CUMSL}$" is zero (0). If the $I_{CUMSL}$ is zero, the computed enablement state decision "$S_{CTRL}$" is determined or assumed to be the enabled state (136). Further, the $I_{CUMSL}$ is re-calculated, reset or updated to take into account the current $I_{CUMSL}$ and the maximum load measurement "$I_{MAX}$". As well, if no loads have thus far been determined or assumed to be in the enabled state, an assumption is typically made that this load will be determined to be in the enabled state.

If the $I_{CUMSL}$ is not zero, a third query (138) is made as to whether the current number of segments needed to fulfill the duty cycle of the corresponding load "$n_{SN}$" is greater than or equal to the remaining number of segments in the period. The current number of segments needed to fulfill the duty cycle of the load is determined by subtracting "$n_{on}$" from the total number of segments within the period which are needed to fulfill the current duty cycle of the load "$n_{SN}$". The remaining number of segments in the period is determined by subtracting the current time segment number "$n_s$" from the total number of time segments in the period "$N_{smax}$". If the answer to the query is "yes", the computed enablement state decision "$S_{CTRL}$" is determined or assumed to be the enabled state and the $I_{CUMSL}$, is re-calculated, reset or updated (136). In other words, the load is assumed to be enabled as time is running out for the load to meet its duty cycle requirements.

If the answer to the third query (138) is "no", a fourth query (140) is made as to whether the computed cumulative system load "$I_{CUMSL}$" is greater than the target system equilibrium "$I_{TSE}$". If the $I_{CUMSL}$ is greater than the $I_{TSE}$, the computed enablement state decision "$S_{CTRL}$" is determined or assumed to be the disabled state (132). In other words, as the target system equilibrium has been reached, it may be assumed that no further loads will be enabled.

If the $I_{CUMSL}$ is not greater than the $I_{TSE}$, a fifth query (142) is made as to whether the gap to the target system equilibrium "$I_{GT}$" is greater than zero (0). If the $I_{GT}$ is not greater than zero, the computed enablement state decision "$S_{CTRL}$" is determined or assumed to be the disabled state (132).

If the $I_{GT}$ is greater than zero, a sixth query (144) is made as to whether the maximum load measurement "$I_{MAX}$" or energy demand of the load is less than the gap to the target system equilibrium "$I_{GT}$". If the answer to the sixth query (144) is "yes", the computed enablement state decision "$S_{CTRL}$" is determined or assumed to be the enabled state and the $I_{CUMSL}$ is re-calculated, reset or updated (136). In other words, as a gap still exists which will not be exceeded by the load, it is assumed that this load is enabled.

If the answer to the sixth query (144) is "no", a seventh query (146) is made as to: (a) whether the maximum load measurement "$I_{MAX}$" or energy demand of the load is less than or equal to twice the gap to the target system equilibrium "$I_{GT}$"; and (b) whether the number of segments currently needed to fulfill the duty cycle of the present load "$n_{SN}$" is equal to the current $n_{SN}$ level "$n_L$", being the current $n_{SN}$ of the previously processed load. If the answer to both enquiries of the seventh query (146) is "yes", the computed enablement state decision "$S_{CTRL}$" is determined or assumed to be the enabled state and the $I_{CUMSL}$ is re-calculated, reset or updated (136).

The second question (b) of the seventh query (146) relates to identifying whether the given or present load is of the same need as the previously processed load, i.e., whether the loads are of a common need level. Thus, the first question (a) is only determined (i.e. allowing an overshoot of the $I_{TSE}$) on loads with the same need level. If the given load is of a lesser need than the previous load, it should not be allowed to overshoot the $I_{TSE}$ once higher priority loads have had a chance to be enabled. This allows a scheduling algorithm whereby the $I_{TSE}$ is overshot at the first opportunity if the overshoot is lower in magnitude than the undershoot for loads of the same need level. This will avoid the case where in the last segment, it is determined that all loads must be enabled (thereby potentially causing a peak load value equal to the theoretical maximum).

If the answer to either of the enquiries of the seventh query (146) is "no", no action is taken and the current $n_{SN}$ level of the previously processed load ($n_L$) is simply reset or updated to the current $n_{SN}$ of the present or given load (148). Similarly, once the computed enablement state decision "$S_{CTRL}$" is determined or assumed to be the disabled state (132), the current $n_{SN}$ level of the previously processed load ($n_L$) is also reset or updated to the current $n_{SN}$ of the present or given load (148).

Once the computed enablement state decision "$S_{CTRL}$" is determined or assumed to be the enabled state (136), a determination (150) is made as to whether the enabled state decision made by the apparatus relates to its corresponding load. If the enablement state decision does not relate to its corresponding load, the current $n_{SN}$ level "$n_L$" is simply reset or updated to the $n_{SN}$ of the present or given load (148) and no further action is taken. However, if the enablement state decision does relate to its corresponding load, the processor (36) directs the controller (40) to implement the enablement state decision to actuate the load to the enabled state. Further, the number of time segments that the load has been in the enabled state "$n_{ON}$" is updated to equal the current $n_{ON}$ plus one (1). As well, the current $n_{SN}$ level of the previously processed load ($n_L$) is subsequently reset or updated to the $n_{SN}$ of the present or given load (148).

Finally, once the $n_{SN}$ level "$n_L$" is reset or updated (148), a determination (154) is made regarding whether the process, as described above, has been conducted for all of the available sets of load state data. If it has not, the process is continued by returning to the step (128) for determining the gap to the target system equilibrium "$I_{GT}$" and performing the first to seventh queries for the next load in the decision making sequence. If the process has been conducted for all of the available sets of load state data, an updated or reset system equilibrium deficit over the period "$I_{SED}$" is determined or calculated (156) based upon the given or present $I_{SED}$, as well as the target system equilibrium "$I_{TSE}$" and the computed cumulative system load "$I_{CUMSL}$".

The algorithm then proceeds back to FIG. 8(a) at point designation "B".

Example

Figure 9:
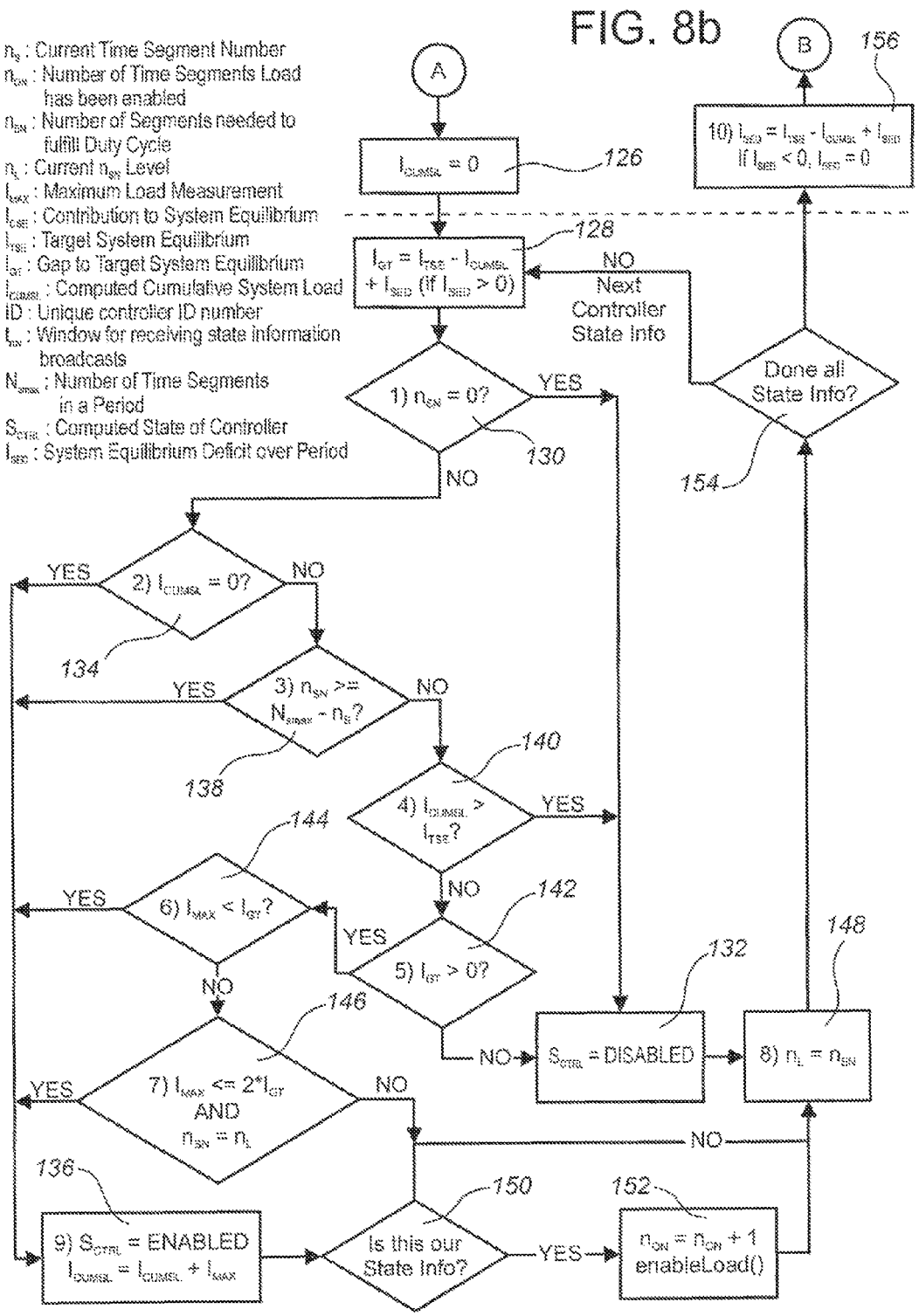
FIG. 9 is a chart providing the results of an example of the performance of the methods as depicted in the flow charts of FIGS. 5 through 8b.

The following example serves more fully to illustrate the invention. In particular, FIG. 9 provides the results of an example of the performance of the algorithms or sets of instructions provided in the flow charts of FIGS. 5 through 8b by the apparatus (26). For the example, the period is comprised of 12 segments and the group of loads is comprised of three loads, being the load (24) and two other loads (24a, 24b), having the following characteristics:

| Load # | $I_{MAX}$ Watts Max Load | $r_{DC}$% Duty Cycle | $I_{CSE}$ Watts Contribution to system equilibrium | $n_{SN}$ segments in Period needed | $n_{SN}$ rounded |
|---|---|---|---|---|---|
| 1 | 500 | 55% | 275 | 6.6 | 7 |
| 2 | 1000 | 40% | 400 | 4.8 | 5 |
| 3 | 1500 | 30% | 450 | 3.6 | 4 |
| | | $I_{TSE}$ | 1125 | | |

The results are set out in FIG. 9 for each of the three loads and for each of the twelve segments of the period. As shown in FIG. 9, the resulting average load for the period is 1208.333 Watts, while the peak load or peak energy demand for the period is 1500 Watts.

A more specific procedure for adjusting the duty cycle of the load (24) according to some method, apparatus and computer readable medium aspects of the invention is hereafter described, with reference to FIG. 2, FIGS. 5-8b and FIG. 10.

Referring to FIG. 5, the current duty cycle ratio "$r_{DC}$" is an assigned duty cycle which represents a percentage of time that the load (24) is capable of operating even when the load is not actually operating. The desired increment or decrement value for the duty cycle ratio "$DC_{INC}$" is an amount which must be added to or subtracted from the duty cycle ratio "$r_{DC}$" in order to adjust the duty cycle ratio "$r_{DC}$" to provide a new or updated duty cycle ratio "$r_{DC}$".

Figure 10:
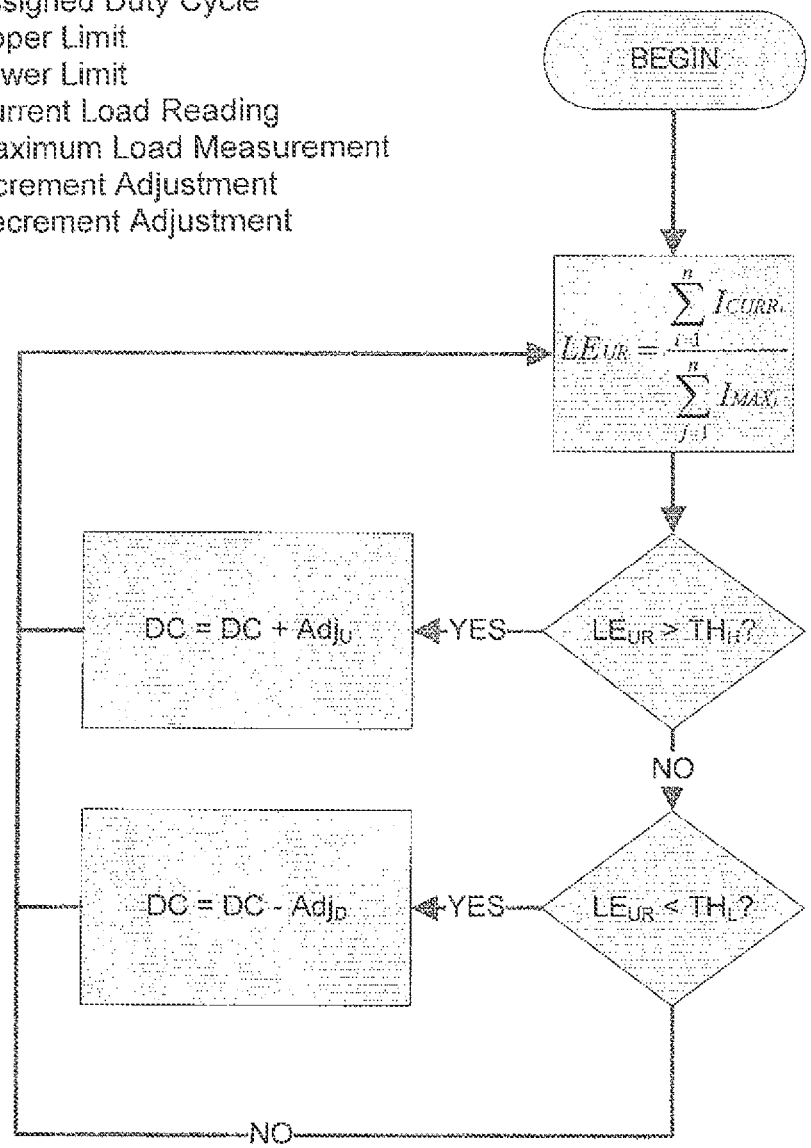
FIG. 10 is a flow chart depicting a preferred method for managing an enablement state of an energy consuming load which comprises adjusting an assigned duty cycle for the load.

Referring to FIG. 10, a preferred method is depicted for adjusting the current assigned duty cycle "DC". Assigned duty cycle "DC" in FIG. 10 is equivalent to "$r_{DC}$" in FIG. 5, increment adjustment "$Adj_U$" in FIG. 10 is equivalent to an increment value "$DC_{INC}$" in FIG. 5, and decrement adjustment "$Adj_D$" in FIG. 10 is equivalent to a decrement value "$DC_{INC}$" in FIG. 5.

In the preferred embodiment, the load (24) is also configured to operate according to a natural duty cycle which represents a percentage of time that the load (24) must actually operate in order to provide a particular result. In the preferred embodiment, a control system (not shown) may be associated with the load (24) in order to configure the load (24) to operate according to the natural duty cycle.

Referring to FIG. 10, the procedure is comprised of assigning an assigned duty cycle "DC" to the load (24), determining a load enabled utilization value "$LE_{UR}$" for the load (24), and adjusting the assigned duty cycle "DC" for the load (24) using the load enabled utilization value "$LE_{UR}$".

Referring to FIGS. 5-8b and FIG. 10, in the preferred embodiment the procedure for adjusting the duty cycle of the load (24) is performed concurrently with the method for managing the group of energy consuming loads as described above with reference to FIGS. 5-8b.

In the preferred embodiment, the initial assigned duty cycle "DC" for the load (24) may be input using a keypad on the adjustment device (68), and adjustments to the assigned duty cycle "DC" may be implemented by the adjustment device (68) as a result of instructions received by the adjustment device (68) from the processor (36) via a computer readable medium. As a result, in the preferred embodiment, the assigned duty cycle for the load (24) is assigned to the load indirectly via the apparatus (26).

In the preferred embodiment, each set of load state data which is generated for the load (24) is comprised of an indication of the extent to which the load (24) is actually operating during the segment to which the set of load state data relates.

In the preferred embodiment, the load enabled utilization value is determined once for each period using the sets of load state data which are generated for the segments during that period. In the preferred embodiment, the assigned duty cycle "DC" is adjusted once during each period using the load enabled utilization value which is determined for that period.

In other embodiments, the load enabled utilization value may be determined (and the assigned duty cycle "DC" may be adjusted) more frequently or less frequently, and/or the load enabled utilization value may be determined (and the assigned duty cycle "DC" may be adjusted) using sets of load state data generated for a single segment, for a plurality of segments in a single period, or for a plurality of segments in a plurality of periods.

For example, in some embodiments, the load enabled utilization value may be determined following a segment using sets of load state data generated for a number of the most recent previous segments, so that the load enabled utilization value represents a "sliding" load enabled utilization value. In some embodiments, the number of most recent previous segments may be equivalent to the number of segments in a period. As a result, in the context of the preferred embodiment in which a period is comprised of twelve segments, the load enabled utilization value may be determined following a segment using the sets of load state data generated for the twelve most recent previous segments, regardless of whether the segments are included in the same period.

In the preferred embodiment, the load enabled utilization value for the load (24) is comprised of, consists of or consists essentially of a ratio of the amount of energy consumed by the load (24) while the load (24) is in the load enabled state to the energy which would be consumed by the load (24) if the load (24) were actually operating at all times while the load (24) is in the load enabled state. In the preferred embodiment, the amount of energy consumed by the load (24) is measured using the sensor device (56) which senses the energy demand of the load (24).

Referring to FIG. 10, in the preferred embodiment the amount of energy consumed by the load (24) while the load (24) is in the load enabled state is represented by measurements of current load reading "$I_{CURR}$" summed or integrated over the time "i" that the load (24) is actually operating while in the load enabled state, and the amount of energy which would be consumed by the load (24) if the load (24) were actually operating at all times while the load (24) is in the load enabled state is represented by the maximum load measurement "$I_{MAX}$" summed or integrated over the total time "j" that the load (24) is in the load enabled state.

The assigned duty cycle for the load (24) is adjusted by increasing the assigned duty cycle when the load enabled utilization value is above an upper limit. In the preferred embodiment, the upper limit is a ratio slightly less than 1:1.

The assigned duty cycle for the load (24) is adjusted by decreasing the assigned duty cycle when the load enabled utilization value is below a lower limit. In the preferred embodiment, the lower limit may depend upon the desired aggressiveness in managing the load (24).

The assigned duty cycle for the load (24) is adjusted by maintaining the current assigned duty cycle when the load enabled utilization value is between the lower limit and the upper limit.

The increment or decrement value "$DC_{INC}$" of the assigned duty cycle "DC" therefore depends upon the load enabled utilization value.

In the preferred embodiment, the increment or decrement value "$DC_{INC}$" of the assigned duty cycle "DC" is equal to the percentage of time represented by one segment in a period. As a result, if the load enabled utilization value is above the upper limit, the assigned duty cycle "DC" is increased by a percentage equivalent to one or more segments as a proportion of the total period, and if the load enabled utilization value is below the lower limit, the assigned duty cycle "DC" is decreased by a percentage equivalent to one or more segments as a proportion of the total period.

In other embodiments, the upper limit of the load enabled utilization value and the lower limit of the load enabled utilization value may define a target range for the load enabled utilization value and the increment or decrement value "$DC_{INC}$" is selected so that the next determined load enabled utilization value may be expected to be at a desired position within the target range.

In the preferred embodiment, a ceiling limit for the assigned duty cycle "DC" may be provided, wherein the ceiling limit defines the maximum assigned duty cycle which may be assigned to the load, so that when the load enabled utilization value is above the upper limit and the assigned duty cycle "DC" is at the ceiling limit, the assigned duty cycle "DC" is not increased. Similarly, in the preferred embodiment, a floor limit for the assigned duty cycle "DC" may be provided, wherein the floor limit defines the minimum assigned duty cycle which may be assigned to the load, so that when the load enabled utilization value is below the lower limit and the assigned duty cycle "DC" is at the floor limit, the assigned duty cycle "DC" is not decreased.

Finally, in this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A method for managing an enablement state of an energy consuming load, wherein the enablement state is either a load enabled state or a load disabled state, wherein the load enabled state is a state where the load is capable of operating even when the load is not actually operating, and wherein the load disabled state is a state where the load is not capable of operating, the method comprising:
   (a) assigning an assigned duty cycle to the load which represents a percentage of time that the load is in the load enabled state;
   (b) determining a load enabled utilization value for the load, wherein the load enabled utilization value provides an indication of an extent to which the load is actually operating while the load is in the load enabled state; and
   (c) adjusting the assigned duty cycle for the load using the load enabled utilization value.

2. The method as claimed in claim 1 wherein the load is configured to operate according to a natural duty cycle which represents a percentage of time that the load must actually operate in order to provide a particular result, and wherein the operation of the load according to the natural duty cycle is constrained by the assigned duty cycle for the load.

3. The method as claimed in claim 2 wherein the load is a discretionary load and wherein the natural duty cycle for the load is less than 100 percent.

4. The method as claimed in claim 3 wherein the assigned duty cycle for the load is less than 100 percent.

5. The method as claimed in claim 1 wherein the load enabled utilization value is a ratio of an amount of energy consumed by the load while the load is in the load enabled state to an amount of energy which would be consumed by the load if the load were actually operating at all times while the load is in the load enabled state.

6. The method as claimed in claim 5, further comprising measuring the amou of energy consumed by the load while the load is in the load enabled state.

7. The method as claimed in claim 1 wherein the load enabled utilization value is a ratio of an amount of time that the load is actually operating while the load is in the load enabled state to an amount of time that the load is in the load enabled state.

8. The method as claimed in claim 7, further comprising measuring the amount of time that the load is actually operating while the load is in the load enabled state.

9. The method as claimed in claim 1 wherein the assigned duty cycle for the load, is adjusted by increasing the assigned duty cycle when the load enabled utilization value is above an upper limit.

10. The method as claimed in claim 9 wherein the assigned duty cycle for the load is not adjusted by increasing the assigned duty cycle when the load enabled utilization value is above the upper limit if the assigned duty cycle is at a ceiling limit.

11. The method as claimed in claim 1 wherein the assigned duty cycle for the load is adjusted by decreasing the assigned duty cycle when the load enabled utilization value is below a lower limit.

12. The method as claimed in claim 11 wherein the assigned duty cycle for the load is not adjusted by decreasing the assigned duty cycle when the load enabled utilization value is below the lower limit if the assigned duty cycle is at a floor limit.

13. The method as claimed in claim 1 wherein the method is performed in accordance with a schedule.

14. The method as claimed in claim 13 wherein the schedule is comprised of at least one period.

15. The Method as claimed in claim 14 wherein the period is comprised of a plurality of segments, and wherein during each of the segments the load is either in a load enabled state or a load disabled state.

16. The method as claimed in claim 15, further comprising generating a set of load state data from the load for each segment in the period in which the load is in a load enabled state, wherein each set of load state data is comprised of an indication of an extent to which the load is actually operating during the segment, and wherein the load enabled utilization value is determined from the sets of load state data.

17. The method as claimed in claim 16 wherein the schedule is comprised, of a plurality of periods and wherein the method is repeated throughout the periods.

18. A non-transitory computer readable medium providing computer readable instructions for directing a processor to manage an enablement state of an energy consuming load, wherein the enablement state is either a load enabled state or a load disabled state, wherein the load enabled state is a state where the load is capable of operating even when the load is not actually operating, and wherein the load disabled state is a state where the load is not capable of operating, the instructions comprising:
   (a) assigning an assigned duty cycle to the load which represents a percentage of time that the load is in the load enabled state; and
   (b) determining a load enabled utilization value for the load, wherein the load enabled utilization value provides an indication of an extent to which the load is actually operating while the load is in the load enabled state; and
   adjusting the assigned duty cycle for the load using the load enabled utilization value.

19. The non-transitory computer readable medium as claimed in claim 18 wherein the load is configured to operate according to a natural duty cycle which represents a percentage of time that the load must actually operate in order to provide a particular result, and wherein the operation of the load according to the natural duty cycle is constrained by the assigned duty cycle for the load.

20. The non-transitory computer readable medium as claimed in claim 19 wherein the load is a discretionary load and wherein the natural duty cycle for the load is less than 100 percent.

21. The non-transitory computer readable medium as claimed claim 20 wherein the assigned duty cycle for the load is less than 100 percent.

22. The non-transitory computer readable medium as claimed in claim 18 wherein the load enabled utilization value is a ratio of an amount of energy consumed by the load while the load is in the load enabled state to an amount of energy which would be consumed by the load if the load were actually operating at all times while the load is in the load enabled state.

23. The non-transitory computer readable medium as claimed in claim 22, further comprising measuring the amount of energy consumed by the load while the load is in the load enabled state.

24. The non-transitory computer readable medium as claimed, in claim 18 wherein the load enabled utilization value is a ratio of an amount of time that the load is actually operating while the load is in the load enabled state to an amount of time that the load is in the load enabled state.

25. The non-transitory computer readable medium as claimed in claim 24, further comprising measuring the amount of time that the load is actually operating while the load is in the load enabled state.

26. The non-transitory computer readable medium as claimed in claim 18 wherein the assigned duty cycle for the load is adjusted by increasing, the assigned duty cycle when the load enabled utilization value is above an upper limit.

27. The non-transitory computer readable medium as claimed in claim 26 wherein the assigned duty cycle for the load is not adjusted by increasing the assigned duty cycle when the load enabled utilization value is above the upper limit if the assigned, duty cycle is at a ceiling, limit.

28. The non-transitory computer readable medium as claimed in claim 18 wherein the assigned duty cycle for the load is adjusted by decreasing the assigned duty cycle when the load enabled utilization value is below a lower limit.

29. The non-transitory computer readable medium as claimed in claim 28 wherein the assigned duty cycle for the load is not adjusted by decreasing the assigned duty cycle when the load enabled utilization value is below the lower limit if the assigned duty cycle is at a floor limit.

30. The non-transitory computer readable medium as claimed in claim 18 wherein the method is performed in accordance with a schedule.

31. The non-transitory computer readable medium as claimed in claim 30 wherein the schedule is comprised of at least one period.

32. The non-transitory computer readable medium as claimed in claim 31 wherein the period is comprised of a plurality of segments, and wherein during each of the segments the load is either in a load enabled state or a load disabled state.

33. The non-transitory computer readable medium as claimed in claim 32, further comprising generating a set of load state data from the load for each segment in the period in which the load is in a load enabled state, wherein each set of load state data is comprised of an indication of an extent to which the load is actually operating during the segment, and wherein the load enabled utilization value is determined from the sets of load state data.

34. The non-transitory computer readable medium as claimed in claim 33 wherein the schedule is comprised of a plurality of periods and wherein the method is repeated throughout the periods.

35. The non-transitory computer readable medium as claimed in claim 18 wherein the instructions are further comprised of directing, an adjusting device to implement the adjusting of the assigned duty cycle for the load.

36. An apparatus for managing an enablemem state of an energy consuming load, wherein the enablement state is either a load enabled state or a load disabled state, wherein the load enabled state is a state where the load is capable of operating even when the load is not actually operating, and wherein the load disabled state is a state where the load is not capable of operating, the apparatus comprising a processor programmed to
(a) assign an assigned duty cycle to the load which represents a percentage of ne that the load is in the load enabled state;
(b) determine a load enabled utilization value for the load, wherein the load enabled utilization value provides an indication of an extent to which the load is actually operating while the load is in the load enabled state; and
(c) adjust the assigned duty cycle for the load using the load enabled utilization value.

37. The apparatus as claimed in claim 36 wherein the load is configured to operate according to a natural duty cycle which represents a percentage of time that the load must actually operate in order to provide a particular result, and wherein the operation of the load according to the natural duty cycle is constrained by the assigned duty cycle for the load.

38. The apparatus as claimed in claim 37 wherein the load is a discretionary load, and wherein the natural duty cycle for the load is less than 100 percent.

39. The apparatus as claimed in claim 38 wherein the assigned duty cycle for the load is less than 100 percent.

40. The apparatus as claimed in claim 36 wherein the load enabled utilization value is a ratio of an amount of energy consumed by the load while the load is in the load enabled state to an amount of energy which would be consumed by the load if the load were actually operating, at all times while the load is in the load enabled state.

41. The apparatus as claimed in claim 40, further comprising measuring the amount of energy consumed by the load while the load is in the load enabled state.

42. The apparatus as claimed in claim 36 wherein the load enabled utilization value is a ratio of an amount of time that the load is actually operating while the load is in the load enabled state to an amount of time that the load is in the load enabled state.

43. The apparatus as claimed in claim 42, further comprising measuring the amount of time that the load is actually operating while the load is in the load enabled state.

44. The apparatus as claimed in claim 36 wherein the assigned duty cycle for the load is adjusted by increasing the assigned duty cycle when the load enabled utilization value is above an upper limit.

45. The apparatus as claimed in claim 44 wherein the assigned duty cycle for the load is not adjusted by increasing the assigned duty cycle when the load enabled utilization value is above the upper limit if the assigned duty cycle is at a ceiling limit.

46. The apparatus as claimed in claim 36 wherein the assigned duty cycle for the load is adjusted by decreasing the assigned duty cycle when the load enabled utilization value is below a lower limit.

47. The apparatus as claimed in claim 46 wherein the assigned duty cycle for the load is not adjusted by decreasing the assigned duty cycle when the load enabled utilization value is below the lower limit if the assigned duty cycle is at a floor limit.

48. The apparatus as claimed in claim 36 wherein the method is performed in accordance with a schedule.

49. The apparatus as claimed in claim 48 wherein the schedule is comprised of at least one period.

50. The apparatus as claimed in claim 49 wherein the period is comprised of a plurality of segments, and wherein during each of the segments the load is either in a load enabled state or a load disabled state.

51. The apparatus as claimed in claim 50, further comprising generating a set of load state data from the load for each segment in the period in which the load is in a load enabled state, wherein each set of load state data is comprised of an indication of an extent to which the load is actually operating during the segment, and wherein the load enabled utilization value is determined from the sets of load state data.

52. The apparatus as claimed in claim 51 wherein the schedule is comprised of a plurality of periods and wherein the method is repeated throughout the periods.

53. The apparatus as claimed in claim 36 wherein the processor is programmed to direct an adjusting device to implement the adjusting of the assigned duty cycle for the load.

* * * * *

UNITED STATES PATENT AND TRADEMARK OFFICE
CERTIFICATE OF CORRECTION

PATENT NO. : 8,527,109 B2
APPLICATION NO. : 13/012480
DATED : September 3, 2013
INVENTOR(S) : Kulyk et al.

It is certified that error appears in the above-identified patent and that said Letters Patent is hereby corrected as shown below:

In the Specifications:

Column 10
Line 52, change "Mode" to --mode--

Column 10
Line 60, change "Made" to --made--

Column 11
Line 4, change "May" to --may--

Column 31
Line 31, change "Cycle" to --cycle--

In the Claims:

Column 41
Line 19 (Claim 6), change "amou" to --amount--

Column 41
Line 51 (Claim 15), change "Method" to --method--

Column 42
Line 58 (Claim 27), after "ceiling" delete ","

Column 43
Line 37 (Claim 36), change "ne" to --time--

Column 44
Line 2 (Claim 40), after "operating" delete ","

Signed and Sealed this
Fourth Day of February, 2014

Michelle K. Lee
*Deputy Director of the United States Patent and Trademark Office*